US012578807B2

(12) United States Patent
Couleaud et al.

(10) Patent No.: US 12,578,807 B2
(45) Date of Patent: Mar. 17, 2026

(54) METHODS AND SYSTEMS FOR CORRECTING USER INPUT

(71) Applicant: Adeia Guides Inc., San Jose, CA (US)

(72) Inventors: Jean-Yves Couleaud, Mission Viejo, CA (US); Christopher Phillips, Hartwell, GA (US)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 18/140,912

(22) Filed: Apr. 28, 2023

(65) Prior Publication Data

US 2024/0361847 A1     Oct. 31, 2024

(51) Int. Cl.
| | |
|---|---|
| *G06F 3/0484* | (2022.01) |
| *G06F 3/0346* | (2013.01) |
| *G06F 3/0487* | (2013.01) |
| *G06F 3/01* | (2006.01) |
| *G06F 3/03* | (2006.01) |
| *G06F 3/04815* | (2022.01) |

(52) U.S. Cl.
CPC .......... *G06F 3/0346* (2013.01); *G06F 3/0484* (2013.01); *G06F 3/0487* (2013.01); *G06F 3/012* (2013.01); *G06F 3/013* (2013.01); *G06F 3/0304* (2013.01); *G06F 3/04815* (2013.01); *G06F 2203/0331* (2013.01)

(58) Field of Classification Search
CPC .... G06F 3/0346; G06F 3/0484; G06F 3/0487; G06F 3/012; G06F 3/013; G06F 3/0304; G06F 3/04815; G06F 2203/0331; G06F 1/1694; G06F 3/011; G06F 3/014; G06F 3/0482; G06F 3/04842; G06F 3/04883; G06F 3/04886
See application file for complete search history.

(56) References Cited

U.S. PATENT DOCUMENTS

| | | | |
|---|---|---|---|
| 7,030,863 B2 | 4/2006 | Longé et al. | |
| 7,551,994 B2 | 6/2009 | Odinak et al. | |
| 8,818,624 B2 | 8/2014 | Small et al. | |
| 9,430,137 B2 * | 8/2016 | Nakamura | G06F 3/04812 |
| 9,733,707 B2 * | 8/2017 | Kawalkar | G06F 3/016 |
| 10,237,509 B1 * | 3/2019 | Kim | G02B 27/017 |
| 10,884,525 B1 * | 1/2021 | Vonsik | G06F 3/011 |
| 11,314,335 B2 * | 4/2022 | Katz | G06F 3/017 |

(Continued)

FOREIGN PATENT DOCUMENTS

WO     WO-2021165310 A1 *   8/2021   ............. G06F 3/017

OTHER PUBLICATIONS

Goel et al., "WalkType: Using Accelerometer Data to Accommodate Situational Impairments in Mobile Touch Screen Text Entry," Session: Touch Text Entry CHI, pp. 2687-2696 (2012).

*Primary Examiner* — Temesghen Ghebretinsae
*Assistant Examiner* — K. Kiyabu
(74) *Attorney, Agent, or Firm* — HG LAW LLP

(57) ABSTRACT

Systems and methods are described for correcting user input. First motion information detected by a first sensor indicating the motion of a first device is received. Second motion information detected by a second sensor indicating the motion of a user is received. Input information relating to an interaction of the user with the first device is received. An intended input is determined based on the first motion information, the second motion information, and the input information. A function corresponding to the intended input is implemented.

18 Claims, 12 Drawing Sheets

(56)                  References Cited

U.S. PATENT DOCUMENTS

| | | | | |
|---|---|---|---|---|
| 2009/0002203 A1* | 1/2009 | Kataoka | G06F 3/0354 | 341/24 |
| 2009/0201246 A1* | 8/2009 | Lee | G06F 1/1643 | 345/156 |
| 2011/0082619 A1* | 4/2011 | Small | G06F 3/04886 | 701/31.4 |
| 2011/0187651 A1* | 8/2011 | Whitlow | G06F 3/0488 | 345/173 |
| 2011/0234639 A1* | 9/2011 | Shimotani | G01C 21/3664 | 345/661 |
| 2012/0026110 A1* | 2/2012 | Yamano | G06F 3/0418 | 345/173 |
| 2014/0025263 A1* | 1/2014 | Geyer | B60K 35/22 | 701/49 |
| 2014/0035829 A1* | 2/2014 | Hyde | G06F 3/04886 | 345/173 |
| 2014/0062893 A1* | 3/2014 | Kawalkar | G06F 3/0488 | 345/173 |
| 2014/0327641 A1* | 11/2014 | Stoumbos | G06F 3/038 | 345/173 |
| 2015/0002403 A1* | 1/2015 | Dostal | G06F 3/04886 | 345/173 |
| 2015/0052481 A1* | 2/2015 | Ronkainen | G06F 3/04842 | 715/815 |
| 2015/0074602 A1* | 3/2015 | VanBlon | G06F 3/013 | 715/815 |
| 2016/0011719 A1* | 1/2016 | Andersson | G06F 3/0488 | 345/178 |
| 2017/0123587 A1* | 5/2017 | Yang | G06F 3/017 | |
| 2017/0228095 A1* | 8/2017 | Domaradzki | G06F 3/0481 | |
| 2017/0364207 A1* | 12/2017 | Henderson | G06F 3/04186 | |
| 2018/0024661 A1* | 1/2018 | Lin | G09G 5/00 | 345/173 |
| 2018/0039377 A1* | 2/2018 | Akita | B60K 35/10 | |
| 2018/0158053 A1* | 6/2018 | Adams | G02B 27/017 | |
| 2019/0146219 A1* | 5/2019 | Rodriguez, II | G06F 3/0482 | 345/633 |
| 2020/0042172 A1* | 2/2020 | Goulden | G06F 3/04886 | |
| 2020/0301553 A1* | 9/2020 | Taylor | G06F 3/04812 | |
| 2021/0011605 A1* | 1/2021 | Yoshizawa | G06F 3/0418 | |
| 2023/0086516 A1* | 3/2023 | Meyer | G06F 3/044 | 345/173 |
| 2023/0214082 A1* | 7/2023 | Kang | G06F 3/011 | 345/633 |

* cited by examiner

Figure 3:
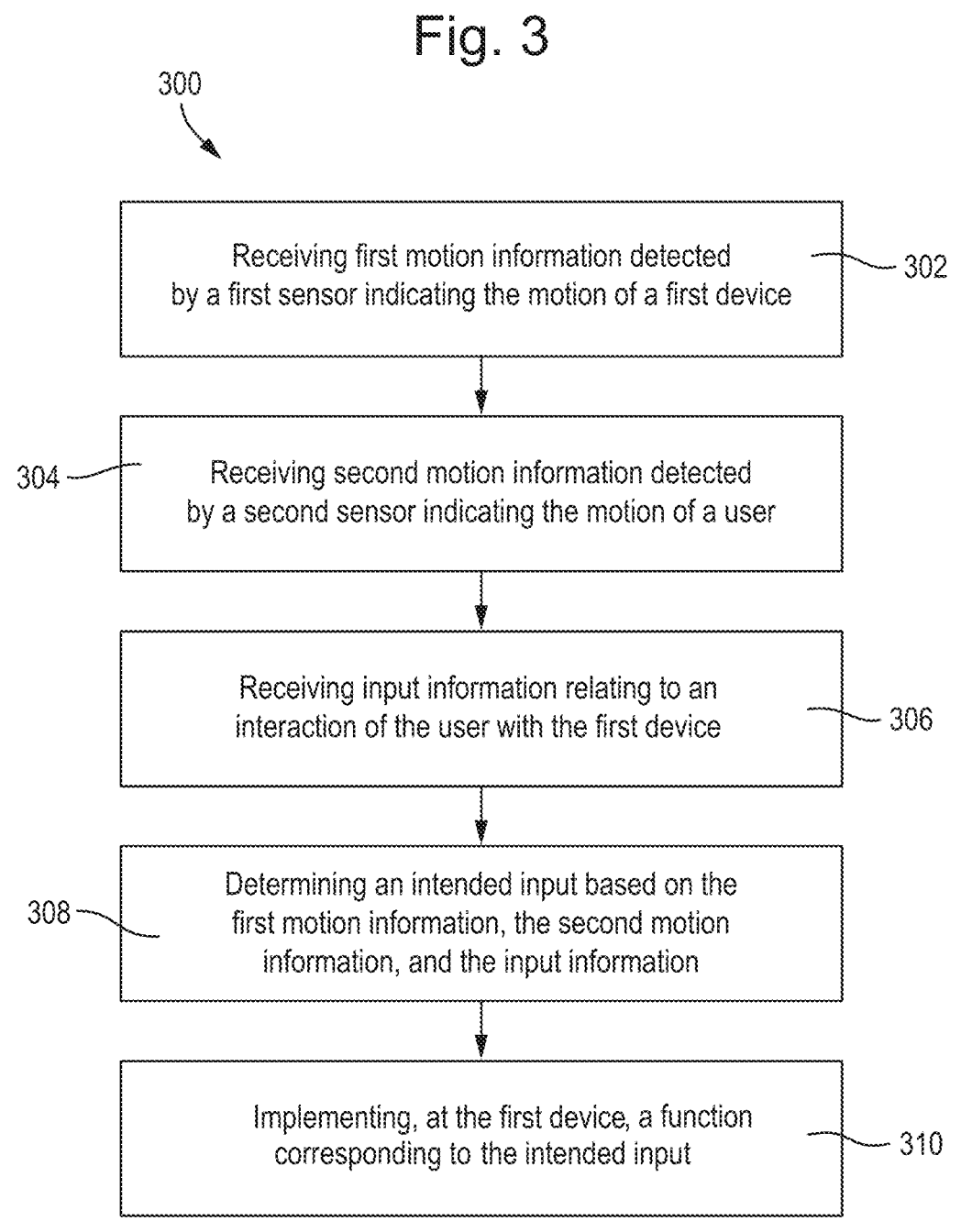

| Receiving first motion information detected by a first sensor indicating the motion of a first device | — 302 |

304 — | Receiving second motion information detected by a second sensor indicating the motion of a user |

| Receiving input information relating to an interaction of the user with the first device | — 306 |

308 — | Determining an intended input based on the first motion information, the second motion information, and the input information |

| Implementing, at the first device, a function corresponding to the intended input | — 310 |

Fig. 10

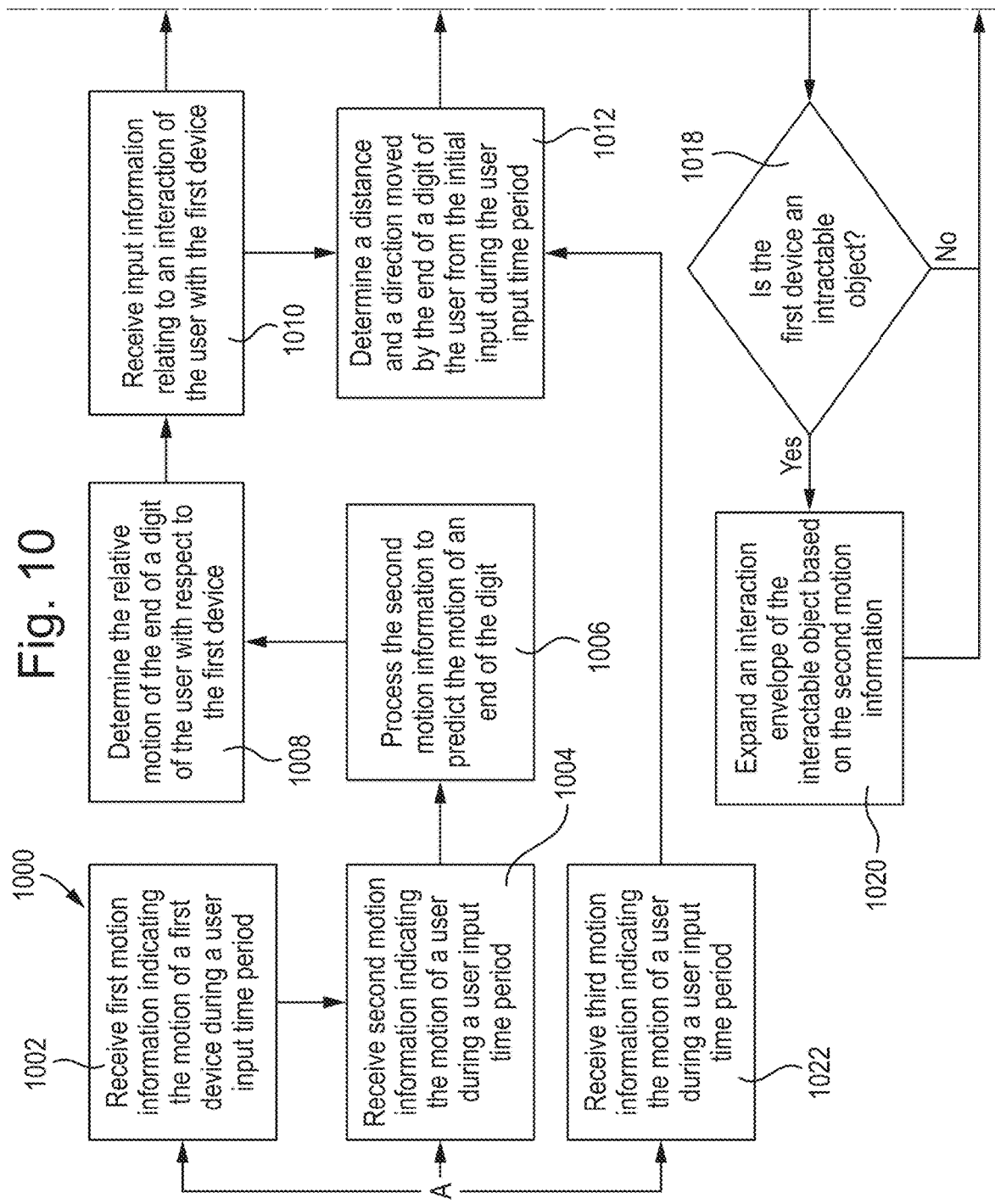

Receive first motion information indicating the motion of a first device during a user input time period — 1002

Receive second motion information indicating the motion of a user during a user input time period — 1004

Process the second motion information to predict the motion of an end of the digit — 1006

Determine the relative motion of the end of a digit of the user with respect to the first device — 1008

Receive input information relating to an interaction of the user with the first device — 1010

Determine a distance and a direction moved by the end of a digit of the user from the initial input during the user input time period — 1012

Receive third motion information indicating the motion of a user during a user input time period — 1022

Is the first device an intractable object? — 1018

Yes

No

Expand an interaction envelope of the interactable object based on the second motion information — 1020

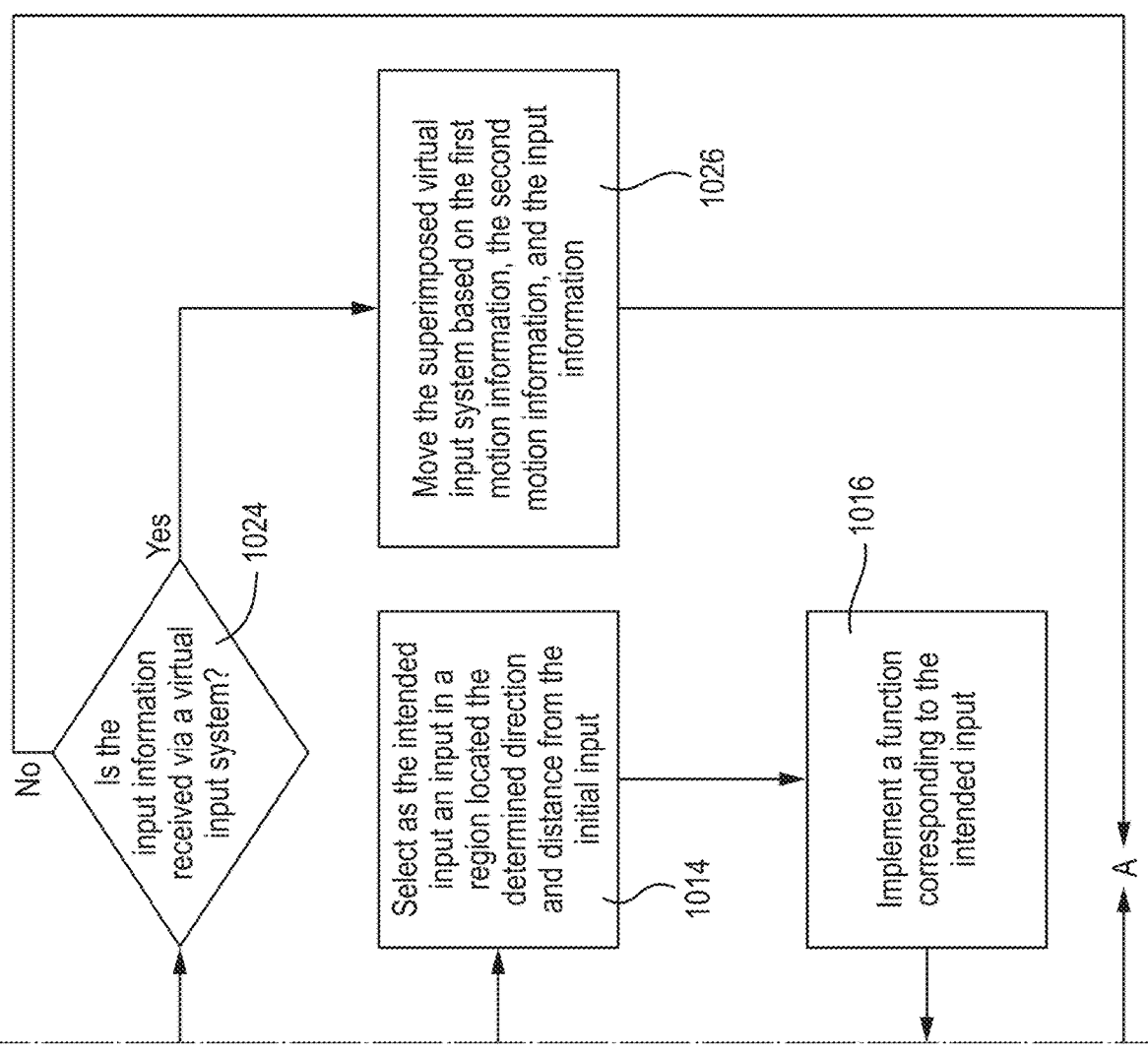

Is the input information received via a virtual input system?

No

Yes    1024

Move the superimposed virtual input system based on the first motion information, the second motion information, and the input information    1026

Select as the intended input an input in a region located the determined direction and distance from the initial input    1014

Implement a function corresponding to the intended input    1016

A

METHODS AND SYSTEMS FOR CORRECTING USER INPUT

BACKGROUND

The present disclosure relates to methods and systems for correcting user input. Particularly, but not exclusively, the present disclosure relates to correcting the input of a user interacting with a device.

SUMMARY

Devices such as mobile devices often have a user interface with which a user interacts by touch. Using touch controls on a device can be challenging for a user when the user is moving relative to the device, as it may be difficult for a user to coordinate their motion with the motion of the device with which they are interacting.

As an example, when a user is situated in a moving vehicle, the motion of the vehicle may cause the user to move in a manner in which they cannot control. For example, vehicles may be submitted to high variations of acceleration or rate of turn, such as a four-wheel drive in an off-road situation, a flying vehicle during a turbulent flight, or during takeoff and landing, and a train in acceleration or deceleration phases, where the resultant forces on the user may be difficult to resist, thereby causing movement of a user which they are not intending or cannot adequately compensate for. This movement of the user may make it difficult for the user to accurately interact with a touch interface of a device while the vehicle is moving.

As a further example, users who have diseases such as Parkinson's disease may have difficulty controlling the motion of their hand relative to a device with which they are interacting, and therefore may have difficulty accurately interacting with a touch interface of a device. For example, such a user may have difficulty controlling the movement of the hand typing on a soft keyboard of a touchscreen device, which may result in the wrong keys being selected.

In order to improve a user's experience when interacting with an interface of a user device, it is desirable to provide a method which is able to determine the intended input of the user.

Systems and methods are provided herein for correcting the input of a user interacting with a device to determine an intended input. For example, by accounting for the relative movement of a user and a device with which the user is interacting, a determination may be made as to the input that the user intended. In particular, by extracting motion information of both the device with which the user is interacting and the motion of the user, the relative motion of the user and the device can be determined, and a correction of a user's actual or initial input can be made in order to determine their intended input. For example, since the user is deformable, the motion of the user is not absolute, for example, the movement of the user's finger will differ from the movement of a user's hand which is holding a device with which the user is interacting. Thus, by determining the relative motion of a hand or finger of a user, and a device with which the user is interacting, the relative motion may be compensated for in order to correct a user's input. A secondary device may be worn by a user that is able to collect movement information indicating the motion of a user.

According to some examples, methods and systems are provided for receiving, using control circuitry, first motion information detected by a first sensor indicating the motion of a first device. For example, the first device may be a mobile device, or a user device, with which a user is interacting (e.g., though a touch interface), for example, a device which is configured to receive input from a user. In an example, the user may interact with a soft control of the device, such as a keyboard. The first device may be a handheld device which the user holds in one hand. The first device may be attached or attachable to a vehicle, for example, to the dashboard or windscreen of a vehicle (in some examples via a connector). The device may be a virtual device or an augmented device. The first motion information may be motion information directly detected by the first sensor, or may be motion information detected by the first sensor which has been processed to indicate the motion of the user. Second motion information detected by a second sensor indicating the motion of a user is received using control circuitry. For example, the second motion information may be motion information relating to a second device, in some examples worn by the user, where the motion of the second device can be used to predict the motion of the user. The second motion information may indicate the motion of a hand, or a digit, of a user. The second motion information may indicate the motion of an end of a digit of a user. A digit of a user may be a finger or a thumb of a user. The end of a digit may be taken to be a tip of a digit, such as the tip of a finger or the tip of a thumb. The end of a digit may be considered to be a region provided on a portion of a user's digit furthest from the user's hand. The end of a digit may be a pad of the digit. The second motion information may be motion information directly detected by the second sensor, or may be motion information detected by the second sensor which has been processed to indicate the motion of a user. For example, where the second sensor is a camera, the images taken by the camera may be processed in order to determine the motion of the hand or digit of a user, where the motion of the hand of the user may be the second motion information. Equally, the images may be the second motion information. Input information (e.g., actual or initial input information) relating to an interaction of the user with the first device is received using control circuitry. For example, the input information may indicate initial input, for example, an element selected by a user in a touch interface of a device. The input information may relate to an element that the user unintentionally selected, for example, where a user was jolted while selecting an element, the jolting may cause the user to select a different element. An intended input is determined based on the first motion information, the second motion information, and the input information using control circuitry. The intended input may be a prediction of an element which the user intended to select, where an initial input corresponding to the input information may correspond to an element which the user actually selected. The intended input may be signaled using control circuitry. For example, the intended input may be signaled to the first device. The signaled intended input may be used in place of the initial input, for example as input to an application of the first device with which the user was interacting. A function (or operation) corresponding to the intended input is implemented at the first device. For example, the intended input is used in place of initial input. For example, an initial input corresponding to a first function may be received, an intended input corresponding to a second function may be determined, and the second function may be implemented (at the first device) while the first function is not implemented.

In some examples, the determining of the intended input comprises determining the relative motion of (e.g., an end of a digit of) the user with respect to the first device based on the first motion information and the second motion information. For example, the intended input may be determined by establishing how the user has moved relative to the first device, and using the relative movement to determine the likely intended input. The motion of the end of a digit of the user may be translated into the reference frame of the first device. The relative motion may comprise information of the motion of the digit in a plane parallel to a face of the first device comprising an interface with which the user is interacting. The motion of the user with respect to the reference frame of the first device may be determined. In an example, where the motion is a repetitive motion, for example, a "shake", a signal from a motion sensor may be processed using signal processing methods, or using a trained model (or a personalized trained model trained for a particular user) in order to account for the shake of the user and predict likely intended input. The relative motion of the user or the second device to the first device may be used in conjunction with the input information in order to determine the intended input.

In some examples, determining the intended input comprises determining a distance and a direction moved by an end of a digit of the user to an initial input (e.g., corresponding to the input information) during a user input time period. For example, in a time period in which the end of a digit of a user is moving towards the user interface of a device, the motion of the user and the motion of the first device may be determined. In particular, it may be determined that a user is intending to select an element of an interface by the detection of the movement of the end of a user's digit towards the interface (e.g., an interface in a face of a first device). The relative motion of the first device and the user in the time period in which the user is intending to select an element may be used to determine the direction and distance that the user moves relative to the first device in order to determine, based on the initial input, the element that the user was intending to select. For example, the intended input may be determined to be within a target region a distance and direction from the initial input (on the user interface) as determined by the first and second motion information. The intended input may be selected as an input comprised in the target region. For example, the target region may comprise more than one element. The target region may be a predetermined size, or may be a size based on the likelihood that the determined relative motion of the first device and the hand of the user from the input indicates the intended input. For example, where the determined relative motion indicates a target region which is a portion on an interface which does not comprise an element (e.g., is between two elements), the target region may be expanded, so that at least one element (e.g., both elements) is provided within the target region. A determination may then be made as to which of the elements the user intended to select. One element may be more likely than another to be intended by the user. For example, where the target region comprises, for example, one element which is fully bounded by the target region, where other elements are only partially within the target region, the fully bounded element may be selected as the most likely intended input. Alternatively, where the user is typing, the preceding letters may be indicative of the likelihood of subsequent letters to have been intended (e.g., by the combination of preceding and subsequent letters forming a word, or forming a word which semantically correlates with previously typed words), where a more likely letter may be selected from within the region as the intended input over a less likely letter.

In some examples, the interface at the user device with which the user is interacting may be adapted based on the first motion information, the second motion information, and the actual input information. For example, the interface may be translated or modified based on the relative movement of the user and the first device. For example, soft controls of the first device may be moved to a position which is likely to align more closely with actual user input. In a further example, the soft controls may be enlarged in order that they are easier for a user to select even when there is relative motion between the user and the first device, where the size of the controls may be proportional to the magnitude of movement between the user and the first device.

In some examples, the second sensor is comprised in finger worn device, such as a smart ring. The second motion information may comprise information relating to the motion of a digit of the user detected by the second sensor. For example, since a smart ring worn by a user has a relatively rigid connection between a digit of the user and the smart ring, motion of the smart ring will correspond closely to the movement of the hand, or a digit, of the user. In one example, the smart ring is worn on the digit with which the user interacts with the first device. The movement of the smart ring may therefore be considered to correlate to the movement of the typing finger. It will be appreciated that the end of a digit may be considered to move in approximately the same way as the base of the digit in the region that the smart ring is worn, or may be considered to flex relative to the base of the digit. The second motion information may be processed to predict the motion of an end of the digit. For example, in the case where the end of the digit is considered to flex relative to the base of the digit, a trained model may be used in order to predict the movement of the end of the digit based on the movement of smart ring. Where the smart ring is worn on a digit other than the digit with which the user interacts with a touch interface, a trained model may be used in order to predict the movement of the end of the digit based on the movement of smart ring. The second sensor may alternatively be comprised in a cap worn over the end of the digit.

In some examples, the second sensor is comprised in a wrist worn device, such as a smart watch, a watch, a bracelet, or a health tracker. The second motion information may comprise information relating to the motion of the wrist of the user detected by the second sensor. For example, since a smart watch worn by a user has a relatively rigid connection between the wrist of the user and the smart watch, the motion of the smart watch will correspond to the movement of the wrist of the user. The second motion information may be processed to predict the motion of an end of a digit of the user. For example, since the end of the digit which interacts with the interface may move relative to the wrist of the user on which the smart watch is provided, a trained model may be used in order to predict the movement of the end of the digit based on the detected movement of the smart watch.

In some examples, the second sensor is an imaging device (e.g., a camera). For example, the second sensor may be configured to obtain image data, where the second sensor may be able to view the hand, and/or a digit, of a user while they are interacting with the first device. In one example, the imaging device is provided externally to the first device. For example, the imaging device may be provided in an extended reality (XR) system (e.g., a pair of augmented reality (AR) glasses, or a virtual reality (VR) headset) in a vehicle. Note, an "XR device" may be any device providing VR, AR, or mixed or merged reality (MR) functionality (e.g., wherein virtual objects or graphic overlays are provided in addition to real-world objects or environments visible via the device). An XR device may take the form of glasses or a headset in some instances. In any event, the imaging device may alternatively be provided in the first device. For example, the imaging device may be provided within the first device so that the imaging device is able to view the hands/hand/digit of a user while they interact with the device, e.g., by being provided proximate to the screen in a central and/or lower portion of the first device with which a user typically interacts in order to interact with the touch interface. The second sensor may comprise a plurality of imaging devices, where the image data may be used to track three-dimensional (3D) movement of the hand of the user. The second motion information may comprise information relating to image data of the motion of a digit of the user obtained by the imaging device. For example, the camera may obtain images of a user's hand or digit. The second motion information may be processed to determine the motion of an end of the digit. For example, the images may be processed in order to determine a motion of the digit of the user. The determined motion of the digit may be relative to the first device, or may be relative to an absolute reference frame. Where the determined motion is relative to an absolute reference frame, the determining of the intended input may comprise translating the motion in the absolute reference frame into the reference frame of the first device.

In an example, the second sensor is comprised in an extended reality head worn device, for example, a pair of XR (e.g., AR) glasses. For example, the second sensor may comprise a camera. A virtual input system may be superimposed onto the first device for receiving the initial input information. It will be appreciated that generally the virtual input system may move in a manner corresponding to the movement of the first device, and therefore motion of the first device may be detected via a sensor provided in the first device, or in a sensor (e.g., camera) provided in the extended reality glasses. In an example, the superimposed virtual input system may be moved (relative to the first device) based on the first motion information and the second motion information. For example, the virtual input system may be moved independently of the first device. The virtual input system may move so that the initial input made by the user would correspond to the intended input of the user.

In an example, the first sensor and/or the second sensor are comprised in a second device comprising an extended reality head worn device, for example, an XR (e.g., VR) head mounted device or HMD. The first device may be a virtual device or an augmented device. For example, the first device may be a device projected by the extended reality head mounted device. It will be appreciated that the first device may appear to the user to move independently of the movement of the extended reality head mounted device, for example, the head of the user may move independently of the movement of the first device. The first sensor may be a camera which tracks the motion of the virtual device (e.g., by tracking of the motion of the hand of a user holding the device), for example, as the motion of the virtual device may be influenced by a user interacting with the virtual device (e.g., holding the device or manipulating the device). The second sensor may be a camera which tracks the motion of a user, for example, the hand or digit of the user. The second sensor and/or the first sensor may be a motion sensor. For example, where the extended reality head mounted device is used in conjunction with extended reality gloves which are configured to track the motion of the users hand in order that the user can interact with the extended reality, motion sensors used to determine the relative position and orientation of the hand of the user provided in the extended reality gloves may be used to determine the motion of a hand of a user to provide the second motion information. It will be appreciated that the motion sensors may be provided in any device that attaches to a user's hand or wrist, such as in a ring, a plurality of rings, a bracelet, or a watch. The second motion information may be processed information to extrapolate the position of the end of a user's digit based on detected motion of the hand, wrist, or digit of the user. In an example, the virtual device is an interactable object. The interaction envelope of the interactable object may be expanded based on the second motion information. For example, if the interactable object is expanded, the likelihood that a user will be able to select their intended target input will increase, even when the user's hand is in motion. For example, where the user has a constant shake of the hand, an increased size of intended target (for example, where the increased size is larger than the distance moved during the shake) will enable a user to provide input with greater accuracy. The interactable object may be expanded based on third motion information comprising detected head movement of the user. For example, where the user has a constant shake of the head, the increased size of the intended target will enable user input to be selected with greater accuracy.

In an example, the determining is performed using additional information from a third sensor. The third sensor may be configured to perform eye tracking to determine the intended input of a user. For example, by tracking the eye movement of a user, it may be possible to determine where on the first device the user is looking. Where a user looks on the first device is likely to correspond to a region with which the user is intending to interact. Therefore, such information may augment a determination of a location of intended input. For example, where a determined region corresponding to the likely intended input comprises more than one element, eye tracking may enable a determination as to which of the elements the user was looking at, and therefore which element should be selected as the intended input. In an example, the determining is performed using additional information from a third sensor, the third sensor configured to detect head movement of the user. For example, where the user's head is moving independently of the hand of the user and the mobile device, it is likely that the lack of coordination between the head, hand and first device will cause an exacerbated error in user input. By accounting for the motion of the head of the user, the intended input may be more accurately determined.

In any of the above examples, the correction to the intended input may be augmented using a trained model. The model may be a personalized model, which has been trained for a particular user, or may be a general model that has been trained by a plurality of users. The model may be configured to predict an intended input based on the relative motion of the first device and the user. The trained model may comprise a transfer function which may be personalized for a particular user or trained for a particular user.

In an example, the first device is one of: a smartphone, a tablet, a touch interface, an extended reality head mounted device, an augmented device, a virtual device, or a smartwatch. In an example, the first sensor is a motion sensor or is a camera useable to capture image data of the motion of the first device. In an example, the first sensor is comprised in at least one of: a smartphone, a tablet, an extended reality head worn device, a smart watch, or a vehicle. In an example, the second sensor is a motion sensor or is a camera useable to capture image data of the motion of a user. In an example, the second sensor is comprised in a second device, the second device comprising any one or more one of: a smartwatch, a smart ring, a bracelet, an extended reality head worn (e.g., mounted) device, a pair of extended reality glasses, a smartphone, or a head-worn device. A sensor may comprise a motion sensor. The sensor may comprise any number or combination of an accelerometer, a gyroscope, a gyrometer, a magnetic sensor, a proximity sensor, an inertial sensor, GPS sensing, and an imaging device. Where any sensor is referred to in the singular, it will be appreciated that a plurality of sensors may be provided, e.g., as the first sensor or as the second sensor. For example, where reference is made to a camera, there may be provided a plurality of cameras. Any combination of the above may be used in order to achieve the methods described herein. In some examples, the first sensor and the second sensor may be provided in the same device. In some examples, the first sensor is provided in a first device and the second sensor is provided in a second device.

According to the systems and methods described herein, the relative motion of a first device and a second device is determined, where the relative motion of the first device and the second device is used in conjunction with input at the first device to determine an intended input.

According to the systems and methods described herein, first motion information relating to a first device and second motion information relating to a user are used in conjunction with initial input at a first device to provide a corrected input.

According to the systems and methods described herein, the detected motion of a device worn on or proximate to a hand of a user is used to correct user input when the hand of the user interacts with an interface of a further device.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 3 is a flowchart representing a process for determining an intended input of a user, in accordance with some examples of the disclosure;

FIG. 10 illustrates is a flowchart representing a process for correcting the input of a user, in accordance with some examples of the disclosure.

DETAILED DESCRIPTION

As is discussed in the background section above, when a touch screen device is used in a situation in which the user moves relative to the device, such as when using a device in a moving vehicle, it may be difficult for the user to select an element on the screen of the device. For example, in a moving vehicle, even though both the user and the device are submitted to the same acceleration, the difference in inertia between the user and the device, in addition to the fact that there is no solid bond between the user and the device at the point of contact of the user's digit with the device, makes it difficult for the user to accurately interact with a touch screen of the device. Eye-finger coordination may also be challenging for a user, which may additionally impact the accuracy of the user. In particular, the user's head also has its own inertia and will move semi-independently of the device and hand of a user when subject to high enough levels of acceleration.

Similarly, where the user of the device has hand-hand or hand-eye coordination issues (such as a person suffering from Parkinson's disease), it may be difficult for the user to accurately select an element on the screen of the device, where the user may select an element other than the one they intended to select.

Methods to address the issue of inaccurate user input into touch screen devices do not consider the relative motion of the user and the device with which they are interacting. Methods and systems herein may utilize a sensor to determine the motion of the device, and a further sensor to determine the motion of the user (e.g., a hand or digit of a user), in order to determine the relative motion of the hand of the user and the device, which may then be used to correct the actual input of the user to determine their intended input.

U.S. Pat. No. 8,818,624 B2 discloses a system and a method for configuring a touch-sensitive area and/or the tap duration associated with a plurality of touch-sensitive soft buttons of a vehicle user interface in response to varying vehicle conditions. However, this document does not use motion information relating to the user as well as motion information relating to a device in order to correct a user's input or vary the configuration of the soft buttons.

Figure 1A:
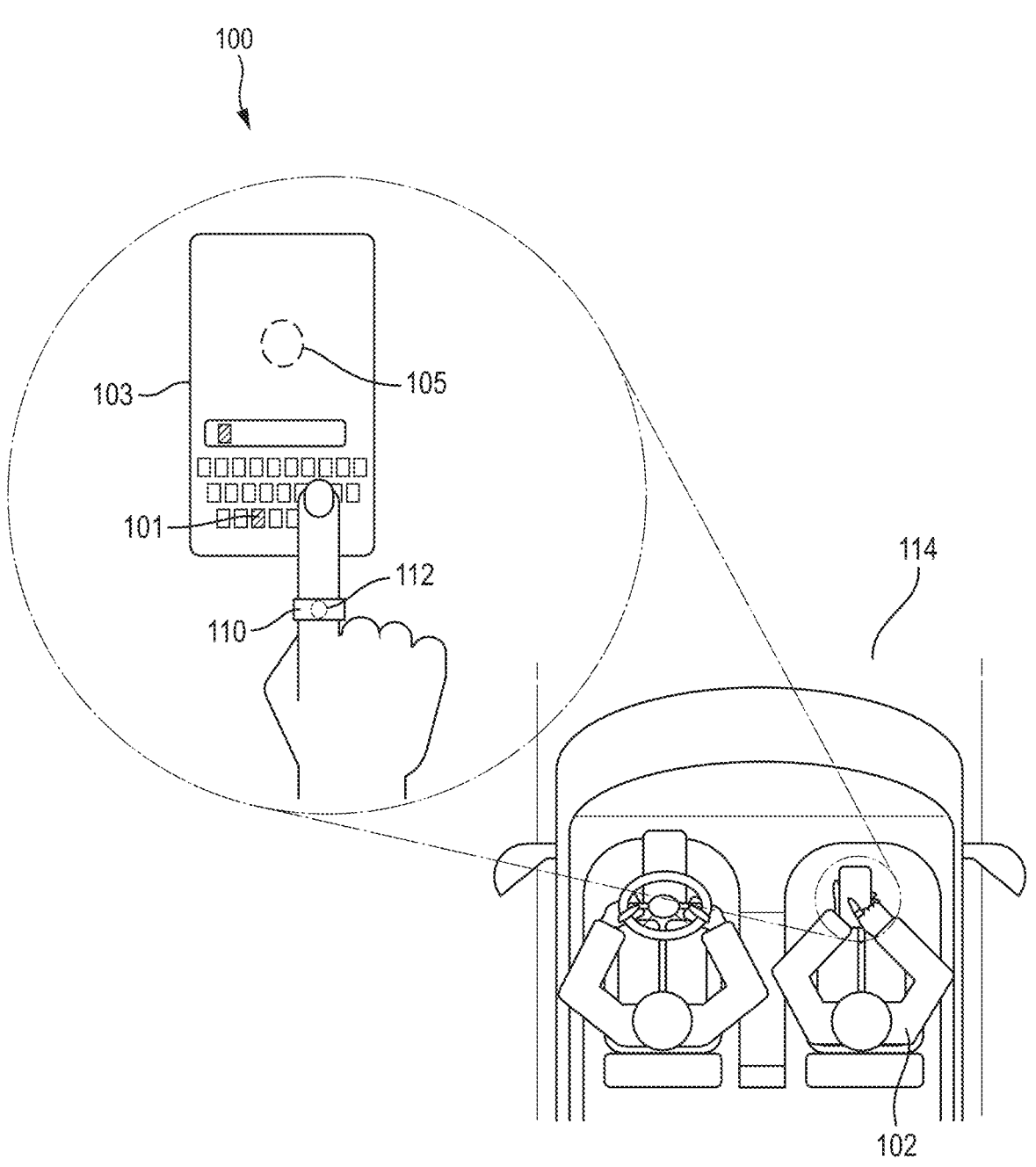
FIG. 1A illustrates an overview of a system for determining an intended input of a user, in accordance with some examples of the disclosure.

In particular, the example shown in FIG. 1A illustrates a user 102 using a first device 103, (in this example, the first device comprising a smartphone) the first device 103 comprising a first sensor 105. The first device 103 (e.g., control circuitry of the first device) may receive first motion information of the first device 103 detected by the first sensor 105. In some examples, the first device 103 is a user device which comprises control circuitry configured to execute an application and provide, at a display screen of the first device 103, a user interface to control the application, and thus the first device 103. The first device 103 (e.g., control circuitry of the first device) may further receive, for example, by way of the user interface, an initial input, or initial input information, relating to an input which the user has made, for example, by selecting an element on a touch interface of the first device 103.

In this example, the first sensor 105 is comprised in the first device 103, and may be communicatively coupled to the first device 103, where the first sensor 105 outputs to the first device 103 detected first motion information. In this example, the first sensor 105 is a motion sensor, for example, an accelerometer, a gyroscope, a gyrometer, a magnetic sensor, a proximity sensor, an inertial sensor, a GPS sensor, or any or number and/or combination thereof.

The example shown in FIG. 1A further illustrates the user 102 wearing a second device 110, the second device 110 comprising a second sensor 112 configured to detect the motion of a user (e.g., by way of detecting motion of the second sensor 112 in this example). In this example, the second sensor 112 is comprised in the second device 110, and is communicatively coupled to the second device 110, where the second sensor 112 outputs to the second device 110 detected second motion information, where the second device 110 then communicates the second motion information to the first device 103. In this example, the second sensor 112 is a motion sensor, for example, an accelerometer, a gyroscope, a gyrometer, a magnetic sensor, a proximity sensor, an inertial sensor, a GPS sensor, or any or number and/or combination thereof. In this example, the second device 110 is provided on a finger of the user 102. Thus, the motion of the user 102 that is tracked using the second sensor 112 correlates to the base of the finger of the user 102.

The second device 110 is communicatively coupled to the first device 103, for example, via a wireless connection between the first device 103 and the second device 110. The first device may be in communication with the second devices by way of a personal area network (PAN) connection (e.g., a Bluetooth or 5G sidelink connection) or a local area network (LAN) connection (e.g., a Wi-Fi connection). The second device 110 may communicate with the first device 103 in order to send to the first device 103 second motion information of the user 102 or the second device 110 (e.g., motion information indicating the motion of the user 102 may be received at the first device 103).

In this example, the user 102 is the passenger in a moving vehicle 114. As the user 102 is a deformable body, forces caused by the acceleration of the vehicle may cause different parts of the user 102 to move relative to one another. In an example, the hand of the user 102 holding the first device 103 may not move as much as the finger of the first device 103 which is interacting with a touch interface of the first device 103. When the user 102 is interacting with the first device 103, for example, via a user interface, such as a touch interface, of the first device 103, the user 102 may perform an initial input, for example, by selecting an element such as a key of a keyboard. Due to the relative motion of the user's finger and the first device 103, the user 102 may select an element other than the element they are intending to select.

As is described above, the first motion information relating to the first device 103 and second motion information relating to the second device 110 may be detected by the first sensor and the second sensor respectively (during a time period in which the user 102 is selecting the initial input) and subsequently received at the first device 103. The initial input may also be received at the first device 103. The first device may use the first information, the second information, and the initial input in order to determine the user's intended input 101. The first device 103 may then implement a function corresponding to the intended input 101, such as displaying the intended input 101 as a key which has been selected in place of the actually selected key. The function corresponding to the intended input may be a function associated with a user interface element. For example, if the intended input is a "volume up" user interface element or button, the "volume up" function or action may be identified as the intended input even if the user failed to interact with the "volume up" element. In some embodiments, the function corresponding to the intended input may be a mobile device function (e.g., any function that may be enabled by an Apple or Android device), a vehicle infotainment system function, a media playback function (e.g., relating to video or audio playback or download), a vehicle navigation system function, or a vehicle climate control function.

While FIG. 1A illustrates that the motion information is received at the first device, in other examples, the motion information may be communicated to a server, where the determination as to the intended input may be made at the server.

Figure 1B:
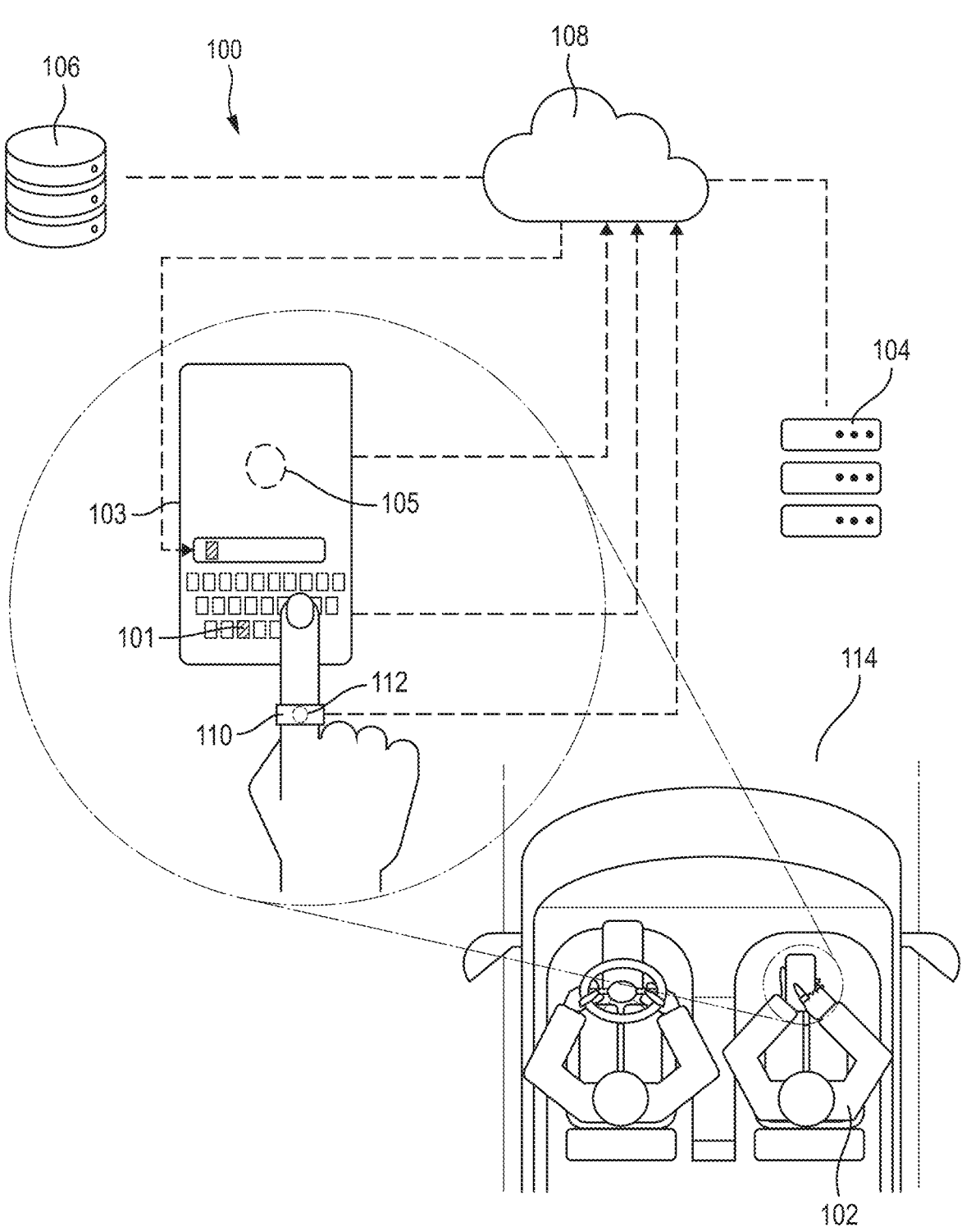
FIG. 1B illustrates an overview of a system for determining an intended input of a user, in accordance with some examples of the disclosure.

FIG. 1B illustrates an overview of a system 100 for determining a user's intended input 101. In particular, the example shown in FIG. 1B illustrates a user 102 using a first device 103, in this example, the first device comprising a smartphone, the first device 103 comprising a first sensor 105, wherein the first device 103 is communicatively coupled to a server 104 and a content item database 106, e.g., via network 108. In this manner, the first device 103 provides the user 102 with access to a service provided by a content provider operating server 104. For example, the service may be a means for determining a user's intended input. The first device 103 may communicate with the server 104 in order to send to the server 104 first motion information of the first device 103 detected by the first sensor 105. The first device 103 may communicate with the server 104 in order to send to the server 104 an initial input, or initial input information, relating to an input which the user has made, for example, by selecting an element on a touch interface of the first device 103.

In some examples, the first device 103 is a user device which comprises control circuitry configured to execute an application and provide, at a display screen of the first device 103, a user interface to control the application, and thus the first device 103. In other examples, server 104 may comprise control circuitry configured to execute an application and cooperate with the first device 103 to provide, at a display screen of the first device 103, a remote user interface to control the application, and thus the user device 103.

In this example, the first sensor 105 is comprised in the first device 103, and may be communicatively coupled to the first device 103, where the first sensor 105 outputs to the first device 103 detected first motion information, where the first device 103 then communicates the first motion information to the server 104. In this example, the first sensor 105 is a motion sensor, for example, an accelerometer, a gyroscope, a gyrometer, a magnetic sensor, a proximity sensor, an inertial sensor, a GPS sensor, or any or number and/or combination thereof.

The example shown in FIG. 1B further illustrates the user 102 wearing a second device 110, the second device 110 comprising a second sensor 112 configured to detect the motion of a user (e.g., by way of detecting motion of the second sensor 112 in this example). In this example, the second device 110 is provided on a finger of the user 102. Thus, the motion of the user 102 that is tracked using the second sensor 112 correlates to the base of the finger of the user 102. The second device 110 is communicatively coupled to the server 104 and the content item database 106, e.g., via the network 108. The second device 110 may communicate with the server 104 in order to send to the server 104 second motion information of the user 102 or the second device 110 (e.g., motion information indicating the motion of the user 102).

In this example, the second sensor 112 may be comprised in the second device 110, and may be communicatively coupled to the second device 110, where the second sensor 112 outputs to the second device 110 detected second motion information, where the second device 110 then communicates the second motion information to the server 104. In this example, the second sensor 112 is a motion sensor, for example, an accelerometer, a gyroscope, a gyrometer, a magnetic sensor, a proximity sensor, an inertial sensor, a GPS sensor, or any or number and/or combination thereof.

In this example, the user 102 is the passenger in a moving vehicle 114. As the user 102 is a deformable body, forces caused by the acceleration of the vehicle may cause different parts of the user 102 to move differently. In an example, the hand of the user 102 holding the first device 103 may not move as much as the finger of the first device 103 which is interacting with a touch interface of the first device 103. When the user 102 is interacting with the first device 103, for example, via a user interface, such as a touch interface, of the first device 103, the user 102 may perform an initial input, for example, by selecting an element such as a key of a keyboard. Due to the relative motion of the user's finger and the first device 103, the user 102 may select an element other than the element they are intending to select.

As is described above, the first motion information relating to the first device 103 and second motion information relating to the second device 110 may be detected by the first sensor and the second sensor respectively, during a time period in which the user 102 is selecting the initial input, and subsequently sent to the server 104. The initial input may also be sent to the server 104. The server 104 may use the first information, the second information, and the initial input in order to determine the user's intended input 101. The intended input 101 may be sent (e.g., signaled) to the first device 103, where the first device 103 may implement a function corresponding to the intended input 101, such as displaying the intended input 101 as a key which has been selected in place of the actually selected key. The function corresponding to the intended input may be a function associated with a user interface element. For example, if the intended input is a "volume up" user interface element or button, the "volume up" function or action may be identified as the intended input even if the user failed to interact with the "volume up" element. In some embodiments, the function corresponding to the intended input may be a mobile device function (e.g., any function that may be enabled by an Apple or Android device), a vehicle infotainment system function, a media playback function (e.g., relating to video or audio playback or download), a vehicle navigation system function, or a vehicle climate control function.

In further examples, the determination may be made in the second device, or any other device. For example, the first device may be in direct (or indirect) communication with the second device. The first device may be in communication with the second devices by way of a personal area network (PAN) connection (e.g., a Bluetooth or 5G sidelink connection) or a local area network (LAN) connection (e.g., a Wi-Fi connection). The second device may send to the first device the second motion information, where the first device determines the intended input, then implements a function corresponding to the intended input. In another example, the second device may determine the relative motion of the first device and the user, which may be sent to the first device, where the first device then determines an intended input based on an initial input and the determined relative motion, and implements a function corresponding to the intended input. Equally, the first device may send the first motion information (and in some cases the initial input) to the second device, where the second device may determine the intended input, where the second device may send the determined intended input to the first device, where the first device implements a function corresponding to the intended input. In a further example, the first device and the second device may send the first motion information and the second motion information to a third device (which may or may not comprise a third sensor), where the third device determines the relative motion of the first device and the user, sends the relative motion information to the first device, where the first device determines an intended input based on the initial input and the determined relative motion, and implements a function corresponding to the intended input. Alternatively, the third device may receive input information from the first device and may determine the intended input, which may then be sent to the first device which implements a function corresponding to the intended input. In some instances, the third device may be proximate to the first and second devices such that it may be in relatively short range wired or wireless communication with either or both the first and second devices. In some examples, the third device may be in communication with the first or second devices by way of a personal area network (PAN) connection (e.g., a Bluetooth or 5G sidelink connection) or a local area network (LAN) connection (e.g., a Wi-Fi connection). In some instances, the third device is an integrated vehicle computer that, for example, provides functionality relating to vehicle safety features, autonomous driving or parking features, vehicle infotainment system features, or vehicle dash or heads-up display features. It will be appreciated that any of the steps described herein may be performed by any device facilitated by the transference of the information required to perform the steps between devices.

Figure 2:
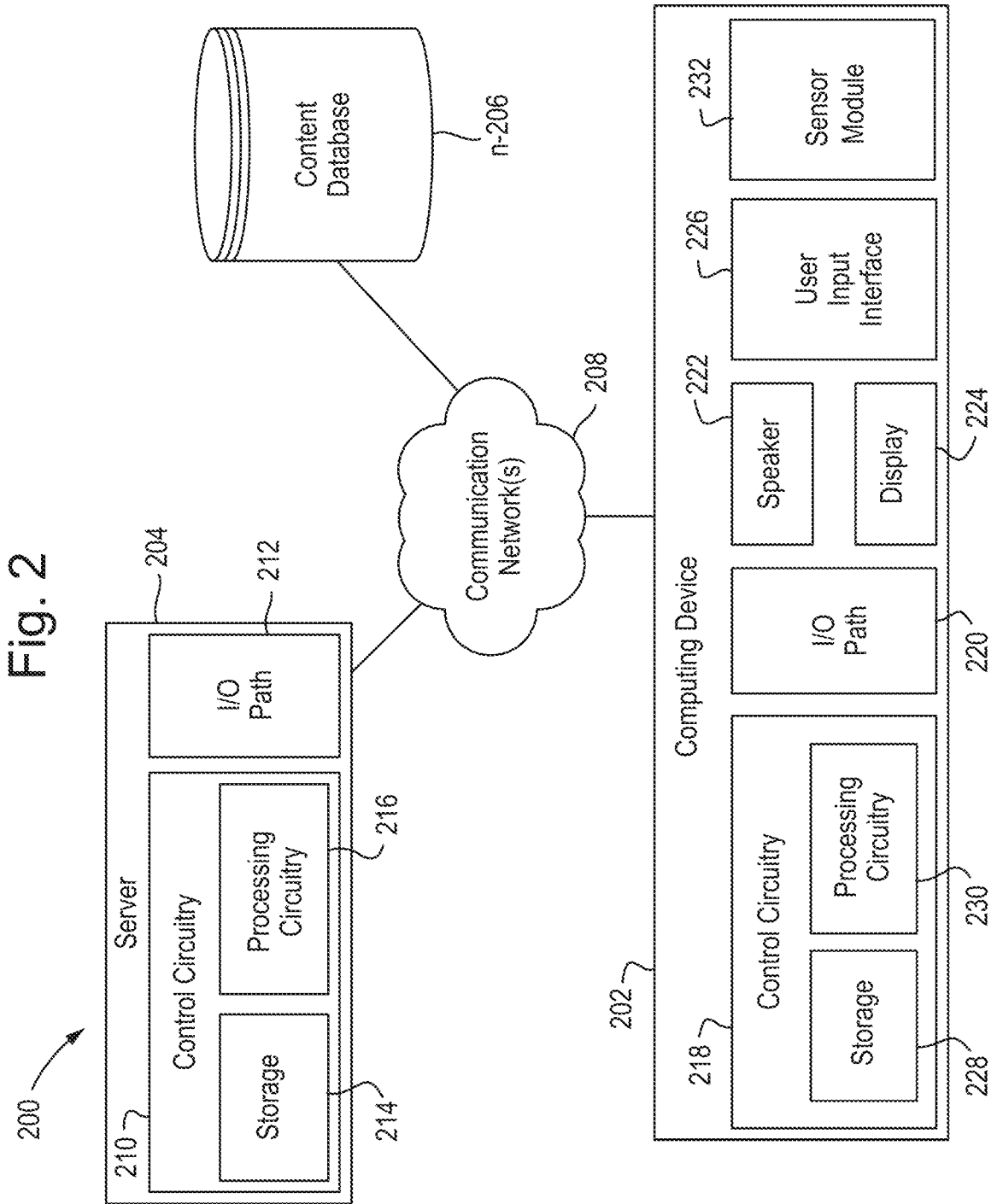
FIG. 2 is a block diagram showing components of an example system for determining an intended input of a user, in accordance with some examples of the disclosure.

FIG. 2 is an illustrative block diagram showing example system 200, e.g., a non-transitory computer-readable medium, configured to determine a user's intended input. Although FIG. 2 shows system 200 as including a number and configuration of individual components, in some examples, any number of the components of system 200 may be combined and/or integrated as one device, e.g., as the first device 103. System 200 includes computing device n-202 (denoting any appropriate number of computing devices, such as the first device 103 and/or the second device 110), server n-204 (denoting any appropriate number of servers, such as server 104), and one or more content databases n-206 (denoting any appropriate number of content databases, such as content database 106), each of which is communicatively coupled to communication network 208, which may be the Internet or any other suitable network or group of networks, such as network 108. In some examples, system 200 excludes server n-204, and functionality that would otherwise be implemented by server n-204 is instead implemented by other components of system 200, such as computing device n-202. For example, computing device n-202 may implement some or all of the functionality of server n-204, allowing computing device n-202 to communicate directly with content database n-206. In still other examples, server n-204 works in conjunction with computing device n-202 to implement certain functionality described herein in a distributed or cooperative manner.

Server n-204 includes control circuitry 210 and input/output (hereinafter "I/O") path 212, and control circuitry 210 includes storage 214 and processing circuitry 216. Computing device n-202, which may be an HMD, a personal computer, a laptop computer, a tablet computer, a smartphone, a smart television, or any other type of computing device, includes control circuitry 218, I/O path 220, speaker 222, display 224, and user input interface 226. Control circuitry 218 includes storage 228 and processing circuitry 220. Control circuitry 210 and/or 218 may be based on any suitable processing circuitry such as processing circuitry 216 and/or 230. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some examples, processing circuitry may be distributed across multiple separate processors, for example, multiple of the same type of processors (e.g., two Intel Core i9 processors) or multiple different processors (e.g., an Intel Core i7 processor and an Intel Core i9 processor).

Each of storage 214, 228, and/or storages of other components of system 200 (e.g., storages of content database 206, and/or the like) may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 2D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Each of storage 214, 228, and/or storages of other components of system 200 may be used to store various types of content, metadata, and or other types of data. Non-volatile memory may also be used (e.g., to launch a boot-up routine and other instructions). Cloud-based storage may be used to supplement storages 214, 228 or instead of storages 214, 228. In some examples, control circuitry 210 and/or 218 executes instructions for an application stored in memory (e.g., storage 214 and/or 228). Specifically, control circuitry 210 and/or 218 may be instructed by the application to perform the functions discussed herein. In some implementations, any action performed by control circuitry 210 and/or 218 may be based on instructions received from the application. For example, the application may be implemented as software or a set of executable instructions that may be stored in storage 214 and/or 228 and executed by control circuitry 210 and/or 218. In some examples, the application may be a client/server application where only a client application resides on computing device n-202, and a server application resides on server n-204.

The application may be implemented using any suitable architecture. For example, it may be a stand-alone application wholly implemented on computing device n-202. In such an approach, instructions for the application are stored locally (e.g., in storage 228), and data for use by the application is downloaded on a periodic basis (e.g., from an out-of-band feed, from an Internet resource, or using another suitable approach). Control circuitry 218 may retrieve instructions for the application from storage 228 and process the instructions to perform the functionality described herein. Based on the processed instructions, control circuitry 218 may determine what action to perform when input is received from user input interface 226.

In client/server-based examples, control circuitry 218 may include communication circuitry suitable for communicating with an application server (e.g., server n-204) or other networks or servers. The instructions for carrying out the functionality described herein may be stored on the application server. Communication circuitry may include a cable modem, an Ethernet card, or a wireless modem for communication with other equipment, or any other suitable communication circuitry. Such communication may involve the Internet or any other suitable communication networks or paths (e.g., communication network 208). In another example of a client/server-based application, control circuitry 218 runs a web browser that interprets web pages provided by a remote server (e.g., server n-204). For example, the remote server may store the instructions for the application in a storage device. The remote server may process the stored instructions using circuitry (e.g., control circuitry 210) and/or generate displays. Computing device n-202 may receive the displays generated by the remote server and may display the content of the displays locally via display 224. This way, the processing of the instructions is performed remotely (e.g., by server n-204) while the resulting displays, such as the display windows described elsewhere herein, are provided locally on computing device n-202. Computing device n-202 may receive inputs from the user via input interface 226 and transmit those inputs to the remote server for processing and generating the corresponding displays.

A computing device n-202 may send instructions, e.g., to implement a function corresponding to intended user input, to control circuitry 210 and/or 218 using user input interface 226.

User input interface 226 may be or include any suitable user interface, such as a remote control, trackball, keypad, keyboard, touchscreen, touchpad, stylus input, joystick, voice recognition interface, gaming controller, an image sensor or camera (e.g., for detecting gesture input), or other user input interfaces. User input interface 226 may be integrated with or combined with display 224, which may be a monitor, a television, a liquid crystal display (LCD), an electronic ink display, or any other equipment suitable for displaying visual images. User input interface 226 may be configured to enable a user to interact with the computing device n-202. Input information relating to the interaction of the user with the user input interface 226 may be received at the control circuitry 210 and/or 218 (or at a further computing device, where the input information may be sent via the I/O path 220 to the further computing device).

Server n-204 and computing device n-202 may transmit and receive content and data via I/O path 212 and 220, respectively. For instance, I/O path 212, and/or I/O path 220 may include a communication port(s) configured to transmit and/or receive (for instance to and/or from content database n-206), via communication network 208, content item identifiers, content metadata, natural language queries, and/or other data. Control circuitry 210 and/or 218 may be used to send and receive commands, requests, and other suitable data using I/O paths 212 and/or 220.

In an example, the computing device n-202 further comprises a sensor module 232 comprising at least one sensor. The sensor may comprise a motion sensor. The sensor may comprise any number or combination of an accelerometer, a gyroscope, a gyrometer, a magnetic sensor, a proximity sensor, an inertial sensor, GPS sensing, and an imaging device. The sensor module 232 may be configured to detect motion of a user or collect data that can be processed in order to detect motion of the user. The control circuitry 218 may receive the detected motion, and/or the detected motion may be sent to another computing device or the server n-204 via the I/O path 220. Detected motion may be received from the server n-204 or from another computing device, for example where a sensor of a further device has detected the motion of the user. The control circuitry 218 of the computing device n-202 or control circuitry 210 of the server n-204 may be used to process the received detected motion (and the input information), for example, to determine an intended input. The control circuitry 218 may be used to implement a function corresponding to the intended input.

FIG. 3 shows a flowchart representing an illustrative process 300 for correcting user input, such as the correction shown in FIG. 1A or FIG. 1B. For the avoidance of doubt, the term "control circuitry" used in the below description applies broadly to the control circuitry outlined above with reference to FIG. 2. For example, control circuitry may comprise control circuitry of the first device 104, control circuitry of the second device 110, and control circuitry of server 104, working either alone or in some combination.

At 302, control circuitry, e.g., control circuitry of the server 104 or the first device 103, receives first motion information detected by a first sensor 105 of a first device 103. In some examples, the first sensor is a sensor, for example, a motion sensor such as an accelerometer, a gyroscope, a gyrometer, a magnetic sensor, a proximity sensor, an inertial sensor, a GPS sensor, or an imaging device, for example, a camera, or any or number and/or combination thereof. A sensor referred to herein may be configured to detect or determine motion in one, two, or three axes. For example, the motion sensor may be configured to detect motion in relation to one dimension, two dimensions, or three dimensions. A motion sensor referred to herein may be comprised of a number of motion sensors. For example, the motion sensor may comprise both a gyrometer and an accelerometer. In other examples, the sensor is an imaging device, for example, a camera. An imaging device may be configured to capture images using any of optical imaging, radar (radio detection and ranging), or LiDAR (light detection and ranging), where image data may be processed in order to determine motion of the first device or the user.

The first sensor 105 may be provided in the first device 103, as is shown in FIG. 1A or FIG. 1B, where the motion of the first sensor 105 correlates with the motion of the first device 103. Alternatively, the first sensor may be comprised in a device other than the first device 103, where the motion of the first device 103 may be detected by observing the first device, 103, such as by using optical imaging, where in such an example, the first sensor 105 may be a camera. For example, the first sensor may be comprised in an extended reality device or a vehicle, for example, where the first sensor is a camera configured to observe the movement of the first device. The first device may be fixed relative to a user 102 (e.g., held by a user), or may be fixed relative to a further object, such as a vehicle 114. Thus, the first motion information may correlate to motion of the user, e.g., a hand of a user in which the first device 103 is held, or may correlate to the motion of another object, such a vehicle 114. The first device 103 may be a user device. In the example of FIG. 1A or FIG. 1B, the first device 103 is a smart ring. In other examples, the first device 103 may be a smart phone, a tablet, a smart watch, a laptop, an augmented device, a virtual device, an XR device, such as an XR headset, a vehicle, or a vehicle mounted display. The first device 103 may be a device with which the user 102 interacts through a user interface, such as a touch screen, in order to perform an initial input.

In some examples, the user wears an extended reality (XR) head worn device, such as a headset or pair of XR glasses. The first device 103 may be operationally coupled with an XR device to provide one or more display elements in an XR environment, the display elements being provided in the XR environment and having a user interface providing functionality for controlling the first device 103, e.g., in a manner substantially similar as to a manner in which a user controls the first device 103 by using a user interface provided at the display screen of the first device 103.

When the user is in or accessing the XR environment, the user can interact with the first device 103, which in some examples is a virtual device, where a virtual device may be communicatively coupled to server 104 and content item database 106, e.g., via network 108. For example, the user may interact with the first device 103, such as a smart phone. In particular, the XR environment may be an AR environment or an MR environment provided or facilitated by XR device 110, which allows the user to physically see the first device 103 and for one or more virtual display elements to be displayed to the user in the AR/MR environment. In other examples, the XR environment may be a VR environment provided by an XR device, which provides a virtual arena or environment which allows the user to see a virtual representation of the first device 103 and for one or more virtual display elements to be displayed to the user in the VR environment. The user may interact with the virtual display elements in order to select an input. In some instances, the XR device may provide such a virtual representation of a device or a virtual device that has no physical counterpart.

The first device 103 may be a physical (electronic) device or a virtual device. Example physical devices include wearable devices (e.g., smart watches), mobile phones, and tablets. A virtual device may be a software-driven representation or proxy of a physical device (e.g., an emulation instantiated by an emulator). In some instances, a virtual device may be a virtual twin of a physical first device 103.

Generally speaking, a "virtual twin" is a virtual device that is linked or synchronized with a particular physical first device 103. From a user's perspective, the virtual twin and the corresponding first device 103 may always appear to be in the same state. Providing user input to one may result in both changing states, responsive to the user input, to a same state. The first device and its virtual twin may exchange state information via any suitable means of communication. A graphical representation of the virtual twin may be generated and displayed. In some instances, the graphical representation is designed to look like the physical user device to which it corresponds. For example, a graphical representation of a virtual twin to a smart watch may depict a wristband, bezel, and other structural components typically associated with the smart watch. In some instances, a graphical representation of a virtual twin includes a display (e.g., and no other hardware or structural components).

In some examples, an XR environment may be provided to a user by an XR device communicatively coupled to an edge of network 108. In this case, the display element may be a remote rendered display (e.g., capable of providing the same or similar content as that displayed by a physical screen of the first device 103), where the content of the display element is encoded at a network edge and sent to the XR device where the rendering is decoded and displayed in the XR environment at spatial coordinates related to the position of the physical user device.

In the examples which are outlined below, the XR device is described as a head worn device, such as comprising a head mounted display, or augmented reality glasses. However, the XR device may be any appropriate type of device, such as a tablet computer, a smartphone, smart contact lens, or the like, used either alone or in combination, configured to display or otherwise provide access to an XR environment.

At 304, control circuitry, e.g., control circuitry of the server 104 or the first device 103, receives second motion information detected by a second sensor 112 indicating the motion of a user 102. The second sensor 112 may be comprised in a second device 110, such as the smart ring of FIG. 1A or FIG. 1B. In some examples, the first sensor 105 and the second sensor 112 are provided in different devices as described in relation to FIG. 1A or FIG. 1B. In other examples, the first sensor 105 and the second sensor 112 are provided in the same device. For example, the second sensor 112 may also be comprised in the first device 103 and may be communicatively coupled to the first device 103, where the second sensor 112 outputs to the first device 103 detected second motion information, where the first device 103 then determines an intended input, or communicates the second motion information to the server 104. For example, the first sensor 105 may comprise an accelerometer provided in the first device 103, and the second sensor 112 may comprise an imaging device provided in the first device 103.

In the example of FIG. 1A or FIG. 1B, the second device 110 is illustrated as being a smart ring. However, in some examples, the second device 110 is a smart watch, a bracelet, a health tracker, a smart phone, an extended reality device such as an XR head worn device, a vehicle. The second device 110 may be a device which is worn by the user 102, for example, at, or proximate to, a hand of the user. For example, the motion of the second device 110 may correlate to motion of the user 102, and in some examples, to a hand or digit of the user 102. The second sensor 112 may be configured to observe the user, for example, a hand of the user 102, e.g., where the second sensor 112 is an imaging device. In some instances, I second sensor (and the second device) may be fixed relative to a user 102 (e.g., held or worn by a user), or may be fixed relative to a further object, such as a vehicle 114 or a computer (e.g., the second sensor may be provided in a second device which is not worn by the user, for example, where the second sensor comprises a camera and/or a depth sensor).

The second motion information may be motion information directly detected by the second sensor 112 or may be motion information which has been detected by the second sensor 112 and subsequently processed. In an example, where the second device 110 is a smart ring, the motion which is detected by the second sensor 112 correlates to the portion of the digit of the user on which the smart ring is worn. It may be assumed that the movement of the end of the digit of the user correlates to the movement of a base of a digit of a user (particularly if the user is wearing the smart ring on the digit with which they are interacting with the user interface), as it may be assumed that the end of the finger is substantially rigidly attached to the base of the digit of the user. It may be assumed that the movement of the end of the digit of the user correlates to the movement of a base of another digit of a user, for example, where the smart ring is worn on a finger other than the finger which is interacting with the user interface it may be assumed that the hand of the user is a non-deformable solid, and therefore the motion of the finger other than the finger which is interacting with the user interface corresponds to the motion of the finger which is interacting with the user interface. It may be assumed that the end of the digit will flex relative to the base of the digit (or the smart ring may be worn on a digit other than a digit that is interacting with the user interface). The detected motion may therefore be processed, for example, using a trained model, in order to determine, or predict, the motion of an end of the digit given the motion information of the base of the digit or another digit, e.g., to determine the motion of the portion of the digit that will interact with the touch interface of the first device 103. In a further example, where the second sensor 112 is comprised in a smart watch, the motion which is detected by the second sensor 112 correlates to the wrist of the user 102. The detected motion may therefore be processed, for example, using a trained model, in order to determine, or predict, the motion of an end of the digit based on the motion of the user's wrist, e.g., to determine the motion of the portion of the digit that will interact with the touch interface of the first device 103.

A trained model may comprise any model that may be trained to take as input data such as motion data or image data and output (e.g., predict) an indication of the motion of a user. In some examples, the model comprises a supervised machine learning model. In another example, a model may be trained using support-vector regression, or Random-Forest regression or other non-linear regressor. In some examples, the model may comprise a random forest model or a decision tree. The model may comprise a classification model, or a regression model. The trained model may be a trained neural network. For the avoidance of doubt, neural networks are a type of supervised machine learning model that may be trained to provide an output for given input data. Neural networks may be trained by providing training data comprising example input data and the corresponding "correct" or ground truth outcome. Neural networks may comprise a plurality of layers of neurons, each neuron representing a mathematical operation that may be applied to the input data. The output of each layer in the neural network is fed into the next layer to produce an output. For each piece of training data, weights associated with the neurons may be adjusted until optimal weightings are found that produce predictions for the training examples reflecting the corresponding ground truths.

In the examples herein, a trained model may be used to predict the motion of the user. For example, given an input of the motion of the user such as the motion of a wrist or digit of a user (e.g., other than the digit that the user is using to interact with the interface of the first device), the trained model may output a prediction of the motion of the end of the digit of the user. A trained model may have been trained using training data comprising, for example, the motion of a wrist or digit of a user (e.g., other than the digit that the user is using to interact with the interface of the first device), with the corresponding motion of the end of the digit of the user. In this way, the model may learn to predict the motion of the end of the digit of the user from input data. Similarly, a trained model may be used to predict the motion of the end of the digit of a user based on image data. For example, training data comprising a series of images of the user's hand may be provided along with corresponding motion of the end of the finger of the user. The model may be trained using the training data to output the motion of the end of the finger of the user based on input image data of the hand of the user.

In a further example, the trained model may be further trained for a particular user. For example, the user may indicate whether the determined intended input is correct or not, and the trained model may adjust its weights accordingly. The trained model may comprise a transfer function which may be personalized for a particular user or trained for a particular user.

At 306, control circuitry, e.g., control circuitry of the server 104 or the first device 103, receives input information relating to an interaction of the user 102 with the first device 103. For example, the user may interact with a user interface of the first device 103 by selecting elements which are presented on the user interface by touching a screen comprising the user interface or interacting with a virtual or augmented interface. In one example, the user selects a soft control from among a plurality of soft controls. In another example, the user selects an element, such as a key, from among a plurality of elements, such as a keyboard. In any of the examples herein, the interface may comprise soft controls or physical (hard) controls. The input information corresponds to an initial input of the user. For example, the input information corresponds to an actual input or element that the user has selected. Where the hand of the user which is interfacing with the user device is moving relative to the device, the actual, or initial, input, may not correspond to the input the user intended to input.

At 308, control circuitry, e.g., control circuitry of the server 104 or the first device 103, determines an intended input based on the first motion information, the second motion information, and the input information. In an example, a determination may be made as to the relative motion between the user and the first device. For example, the first motion information indicating the motion of the first device and the second motion information indicating the motion of the user may be used to determine the relative motion of the user with respect to the first device. The first motion information and/or the second motion information may be processed using a vector space transformation and quaternion integration/Kalman filter algorithm to convert accelerations and rates of turn into relative positions and orientations. In an example, the motion of the user (e.g., the motion of an end of a digit of a user) is projected into a reference frame of the first device. An example of a process to determine the relative motion of the first device and the user is set out below.

A relative position of an object can be determined by integrating twice (e.g., a double integration method) a measurement of acceleration of the object along each axis (e.g., an x, y, and z axis relative to an absolute reference frame). For example, integrating the measurement of acceleration will obtain a measurement of velocity, where integration of the velocity will provide a position. Similarly, the orientation of an object can be determined by integrating twice a measurement of the rate of turn of the object around each axis. Where the motion of an object involves both translation and rotation, e.g., at the same time, an algorithm may be used to determine the position of the object. For example, an algorithm such as quaternion integration may be used to determine an absolute position in three dimensions.

In general, the method outlined below determines the global accelerations of a first device with reference to an absolute reference frame and measured accelerations of the first device in a reference frame of the first device, translates the global acceleration of the first device in the absolute reference frame into the reference frame of the first device, and subtracts the translated global accelerations from the measured accelerations in order to determine the accelerations of the first device in the frame of the first device. These accelerations are then integrated in order to determine the displacement of the first device in the reference frame of the first device. The global accelerations of a second device are determined with reference to an absolute reference frame and measured accelerations of the second device in a reference frame of the second device, the global accelerations of the second device in the absolute reference frame are translated into the reference frame of the second device, and the translated global accelerations are subtracted from the measured accelerations in order to determine the accelerations of the second device in the frame of the second device. The accelerations of the second device in the frame of the second device are then translated into the reference frame of the first device. These accelerations are then integrated in order to determine the displacement of the second device in the reference frame of the first device. A difference between the displacements of the second device and the first device in the reference frame of the first device may then be determined to determine the relative motion between the first device and the second device.

Figure 4:
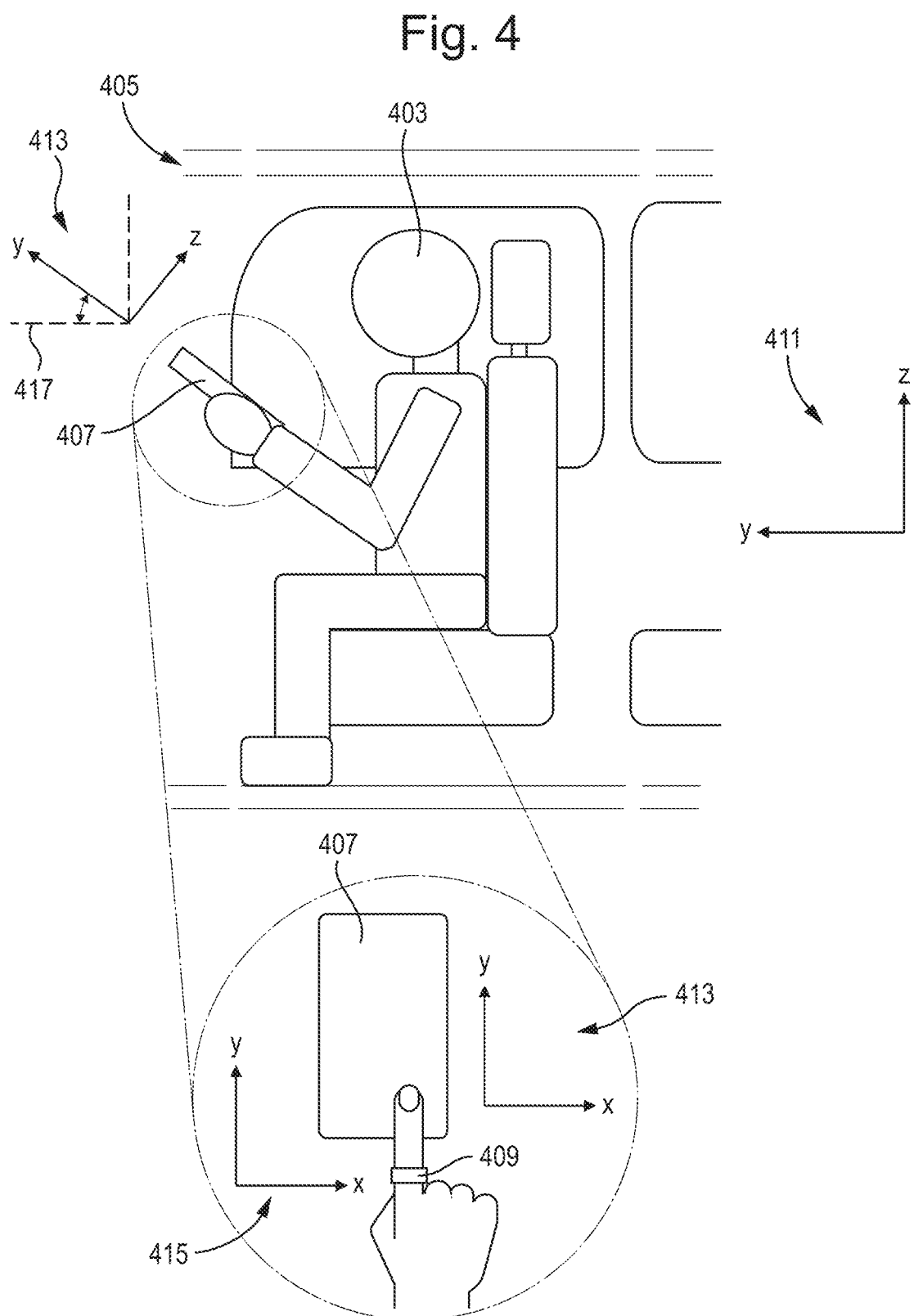
FIG. 4 illustrates an example of reference frames, in accordance with some examples of the disclosure.

These FIG. 4 illustrates the different reference frames which are discussed herein. In particular, FIG. 4 illustrates a user 403 travelling in a vehicle 405 (e.g., as a passenger in a car or bus), where the user 403 is holding a smart phone 407 in one hand and, in this example, is interacting with a keyboard shown in a touch screen of the smart phone 407 with another hand. The user 407 of this example is wearing a smart ring 409.

An absolute reference frame 411 is shown in FIG. 4. For the avoidance of doubt, an absolute reference frame in this context is taken to be a reference frame that is fixed and stationary relative to the earth and is not affected by the motion of any other object or system, and is defined in terms of latitude, longitude, and altitude (y, x and z directions respectively). FIG. 4 also illustrates a reference frame of the first device 413 (e.g., the smart phone 407), and a reference frame of the second device 415 (e.g., the smart ring 409). The reference frame of the first device is configured in this example so that a touch interface of the first device is provided in a face which is parallel to an x-y plane of the reference frame, where the z direction is perpendicular to the face. The reference frame of the second device is configured in this example so that the x-y plane is in a plane substantially parallel to the palm of the user when a user's hand is laid flat. The z direction is perpendicular to the x-y plane. The attitude 417 of the smart phone 407 (first device) is further illustrated in this Figure. For the avoidance of doubt, the attitude in this context is taken to be the orientation of a frame fixed in a body relative to the absolute reference frame.

In order to determine the local motion of a device, such as the motion of the device caused by a user, independent of global accelerations of a device, such as the accelerations caused by a vehicle, global accelerations may be subtracted from the acceleration of the device measured in the reference frame of the device.

Figure 5:
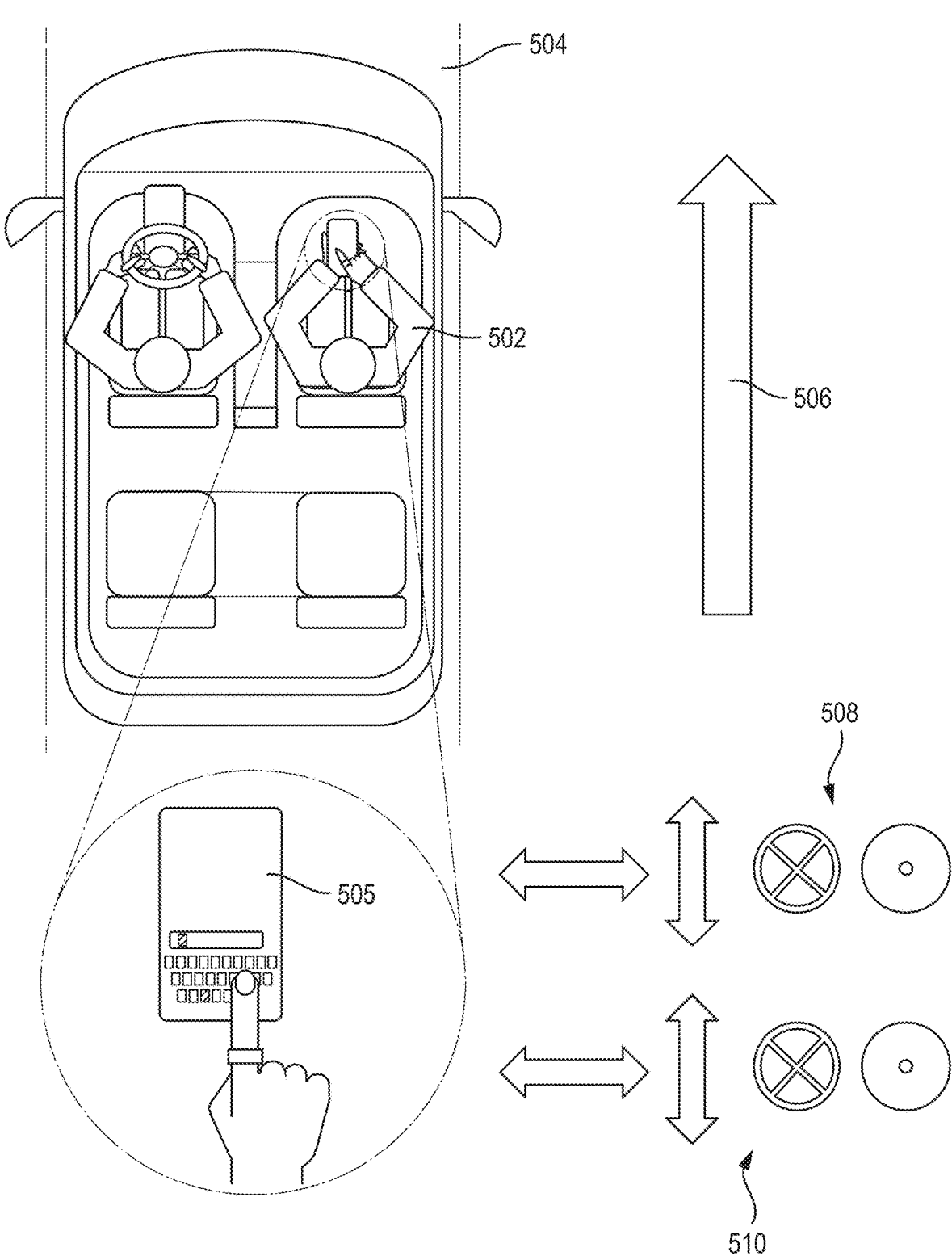
FIG. 5 illustrates an example of motion of the user and the first device, in accordance with some examples of the disclosure.

FIG. 5 illustrates an example of the various motions that may be considered when determining the relative motion of the first device and the user. In particular, FIG. 5 illustrates a user 502 travelling in a vehicle 504 (in this example a car) while interacting with a user device (e.g., a first device 505). Accelerations and decelerations of the vehicle will cause resultant forces to be applied to the user. The first sensor and the second sensor may detect these resultant forces (e.g., accelerations) in addition to forces which are caused by local movement of the user. Global accelerations caused by the device may be accounted for to determine the local movement of each of the user and the first device. For example, global accelerations corresponding to the motion of the vehicle 506 (shown here as motion in an x direction) may be subtracted from measured accelerations of the first device 508 (shown here as motion in a y, x, and z directions into and out of the page). The global accelerations corresponding to motion of the vehicle 506 may be subtracted from the measured accelerations of the user 510 (shown here as motion in a y, x, and z directions into and out of the page).

In an example, a motion sensor (e.g., comprised in the first sensor, or a further sensor, and/or provided in the first device) detects the orientation of a device relative to an absolute reference frame. This attitude of the device may be given by $\theta$, $\phi$, and $\psi$ (pitch, roll and yaw angles respectively). For example, the attitude of the device may be detected by an inertial measurement unit (IMU) and using quaternion integration.

In an example, a sensor (e.g., comprised in the first sensor, or a further sensor, and/or provided in the first device) may detect or measure the acceleration of the device in the frame of reference of the device, $a_{xm}$, $a_{ym}$, and $a_{zm}$. For example, an IMU sensor may comprise an accelerometer and/or a gyrometer, where the accelerometer measures the acceleration across the x, y, and z axes of its local frame, and the gyrometer measures the angular velocity around the x, y, and z axes in its local frame. In an example, since the IMU is provided in the first device, the reference frame of the IMU may be configured to be the same as the reference frame of the device in which the IMU is comprised.

In an example, global accelerations of the device may be determined using global positioning system (GPS) information which provides the positions of the device over a predetermined time period. By determining global accelerations using, for example, GPS, in addition to using accelerations measured in the frame of the device, for example, using an IMU, the accuracy of the determination of the relative motion of the first device and the second device may be improved. In the example below GPS information is used to determine global accelerations, however, it will be appreciated that in other examples IMU sensors may be used instead of or in addition to a GPS sensor to determine global accelerations.

GPS information is typically provided in latitude, longitude, and altitude. For determining measurements over small distances, latitude and longitude may be considered to be approximate to a planar projection, rather than a spherical projection. Thus, global accelerations ($a_{xn}$, $a_{yn}$) in the absolute reference frame may be determined using equations 1 and 2 below.

$$a_{xn} = d^2(\text{Longitude})/dt^2 \qquad (1)$$

$$a_{yn} = d^2(\text{Latitude})/dt^2 \qquad (2)$$

Similarly, global accelerations in the z direction $a_{zn}$ in the absolute reference frame, taking into account gravity (g), may be found using equation 3.

$$a_{zn} = d^2(\text{Altitude})/dt^2 - g \qquad (3)$$

As is described above, if $\theta$, $\phi$, and $\psi$ are pitch, roll and yaw angles respectively, representing the attitude of the device in the absolute frame of reference, then global accelerations ($a_{xn}$, $a_{yn}$, $a_{zn}$) in the absolute reference frame ($x_n$, $y_n$, $z_n$) may be translated into the reference frame of the first device ($x_b$, $y_b$, $z_b$) using the rotation $C_{nb}$ as outlined in equation 4 below, where $R_z$ is the rotation relative to the z axis, $R_y$ is the rotation relative to the y axis, and $R_z$ is the rotation relative to the x axis.

$$C_b^n = R_z(\psi) R_y(\theta) R_x(\phi) \qquad (4)$$

$$C_b^n = \begin{pmatrix} \cos\psi & -\sin\psi & 0 \\ \sin\psi & \cos\psi & 0 \\ 0 & 0 & 1 \end{pmatrix} \begin{pmatrix} \cos\theta & 0 & \sin\theta \\ 0 & 1 & 0 \\ -\sin\theta & 0 & \cos\theta \end{pmatrix} \begin{pmatrix} 1 & 0 & 0 \\ 0 & \cos\phi & -\sin\phi \\ 0 & \sin\phi & \cos\phi \end{pmatrix}$$

$$C_b^n = \begin{pmatrix} \cos\psi\cos\theta & \cos\psi\sin\theta\sin\phi - \sin\psi\cos\phi & \cos\psi\sin\theta\cos\phi + \sin\psi\sin\phi \\ \sin\psi\cos\theta & \sin\psi\sin\theta\sin\phi + \cos\psi\cos\phi & \sin\psi\sin\theta\cos\phi - \cos\psi\sin\phi \\ -\sin\theta & \cos\theta\sin\phi & \cos\theta\cos\phi \end{pmatrix}$$

If $a_{xm}$, $a_{ym}$, and $a_{zm}$ are the measured accelerations in the frame of reference of the first device ($x_b$, $y_b$, $z_b$), then the local accelerations ($a_{xb}$, $a_{yb}$, $a_{zb}$) in the frame of reference of the first device are given by subtracting the global accelerations ($a_{xn}$, $a_{yn}$, $a_{zn}$) in the absolute reference frame ($x_n$, $y_n$, $z_n$) translated into the frame of reference of the first device from the measured accelerations ($a_{xm}$, $a_{ym}$, $a_{zm}$) in the frame of reference of the first device ($x_b$, $y_b$, $z_b$), as is shown in equation 5.

$$\begin{pmatrix} a_{xb} \\ a_{yb} \\ a_{zb} \end{pmatrix} = \begin{pmatrix} a_{xm} \\ a_{ym} \\ a_{zm} \end{pmatrix} - C_b^n \begin{pmatrix} a_{xn} \\ a_{yn} \\ a_{zn} \end{pmatrix} \qquad (5)$$

In a further step, the same process may be used to determine the acceleration of the second device independent of the global accelerations. For example, the attitude of the first device in the absolute frame of reference may first be determined. Global accelerations translated into the reference frame of the second device may be subtracted from accelerations measured by the second device.

For example, a motion sensor (e.g., a motion sensor comprised in the second sensor or a further sensor, and/or provided in the second device) may detect the orientation of a second device relative to an absolute reference frame. This attitude of the device may be given by $\theta_2$, $\phi_2$, and $\psi_2$ (pitch, roll and yaw angles respectively). For example, the attitude of the device may be detected by an inertial measurement unit (IMU).

In an example, a motion sensor (e.g., a motion sensor comprised in the second sensor or a further sensor, and/or provided in the second device) may detect the acceleration of the device in the frame of reference of the device, $a_{xm2}$, $a_{ym2}$, and $a_{zm2}$. For example, an IMU sensor may comprise an accelerometer and/or a gyrometer, where the accelerometer measures the acceleration across the x, y, and z axes of its local frame, and the gyrometer measures the angular velocity around the x, y, and z axes in its local frame. In an example, since the IMU is provided in the first device, the reference frame of the IMU may be considered to be the same as the reference frame of the device in which the IMU is comprised.

As is described above, global accelerations of the second device may be determined using GPS information which provides the positions of the device over a time period. Global accelerations of the second device ($a_{xn2}$, $a_{yn2}$, $a_{zn2}$) in the absolute reference frame may be determined using equations 6-8 below, where the GPS information is provided in latitude, longitude, and altitude, and gravity (g) is considered in the z direction.

$$a_{xn2} = d^2(\text{Longitude})/dt^2 \qquad (6)$$

$$a_{yn2} = d^2(\text{Latitude})/dt^2 \qquad (7)$$

$$a_{zn2} = d^2(\text{Altitude})/dt^2 - g \qquad (8)$$

It will be appreciated that while the global acceleration of the second device outlined below are determined separately to the global accelerations of the first device, in some examples, the global accelerations of the second device may be taken to be the same as the first device determined above. For example, where the first device is a smart phone held by a user, and the second device is a smart watch worn by the user, the long term acceleration of the first device (e.g., the motion of the device in, say, a vehicle) will be the same for the second device, as the long term accelerations of the user will be the same in either case.

If $\theta_2$, $\phi_2$, and $\psi_2$ are pitch, roll and yaw angles respectively of the second device, representing the attitude of the second device in the absolute frame of reference, then global accelerations of the second device ($a_{xn2}$, $a_{yn2}$, $a_{zn2}$) in the absolute reference frame ($x_n, y_n, z_n$) may be translated into the reference frame of the second device ($x_{b2}, y_{b2}, z_{b2}$) using the rotation $C_{nb2}$ as outlined in equation 9 below, where $R_z$ is the rotation relative to the z axis, $R_y$ is the rotation relative to the y axis, and $R_z$ is the rotation relative to the x axis.

$$C_{b2}^n = R_{z2}(\psi_2)R_{y2}(\theta_2)R_{x2}(\phi_2) \qquad (9)$$

$$C_{b2}^n + \begin{pmatrix} \cos\psi_2 & -\sin\psi_2 & 0 \\ \sin\psi_2 & \cos\psi_2 & 0 \\ 0 & 0 & 1 \end{pmatrix}\begin{pmatrix} \cos\theta_2 & 0 & \sin\theta_2 \\ 0 & 1 & 0 \\ -\sin\theta_2 & 0 & \cos\theta_2 \end{pmatrix}\begin{pmatrix} 1 & 0 & 0 \\ 0 & \cos\phi_2 & -\sin\phi_2 \\ 0 & \sin\phi_2 & \cos\phi_2 \end{pmatrix}$$

$$C_{b2}^n = \begin{pmatrix} \cos\psi_2\cos\theta_2 & \cos\psi_2\sin\theta_2\sin\phi_2 - \sin\psi_2\cos\phi_2 & \cos\psi_2\sin\theta_2\cos\phi_2 + \sin\psi_2\sin\phi_2 \\ \sin\psi_2\cos\theta_2 & \sin\psi_2\sin\theta_2\sin\phi_2 + \cos\psi_2\cos\phi_2 & \sin\psi_2\sin\theta_2\cos\phi_2 - \cos\psi_2\sin\phi_2 \\ -\sin\theta_2 & \cos\theta_2\sin\phi_2 & \cos\theta_2\cos\phi_2 \end{pmatrix}$$

If $a_{xm2}$, $a_{ym2}$, and $a_{zm2}$ are the measured accelerations in the frame of reference of the second device, then the local accelerations ($a_{xb2}, a_{yb2}, a_{zb2}$) in the frame of reference of the second device are given by subtracting the global accelerations of the second device ($a_{xn2}, a_{yn2}, a_{zn2}$) in the absolute reference frame ($x_n, y_n, z_n$) translated into the frame of reference of the second device from the measured accelerations ($a_{xm2}$, $a_{ym2}$, $a_{zm2}$) in the frame of reference of the second device ($x_{b2}, y_{b2}, z_{b2}$), as is shown in equation 10.

$$\begin{pmatrix} a_{xb2} \\ a_{yb2} \\ a_{zb2} \end{pmatrix} = \begin{pmatrix} a_{xm2} \\ a_{ym2} \\ a_{zm2} \end{pmatrix} - C_{b2}^n\begin{pmatrix} a_{xn2} \\ a_{yn2} \\ a_{zn2} \end{pmatrix} \qquad (10)$$

The local accelerations of the second device in the frame of reference of the second device ($a_{xb2}, a_{yb2}, a_{zb2}$) may then be translated into the frame of reference of the first device. For example, by determining the relative attitude of the second device with respect to the first device ($\psi-\psi_2$, $\theta-\theta_2$, $\phi-\phi_2$), the rotation $C_{b2b}$ as outlined in equation 11 below may be used to translate the local accelerations of the second device into the reference frame of the first device, where $R_z$ is the rotation relative to the z axis, $R_y$ is the rotation relative to the y axis, and $R_z$ is the rotation relative to the x axis.

$$C_b^{b2} = R_z(\psi - \psi_2)R_y(\theta - \theta_2)R_x(\phi - \phi_2) \qquad (11)$$

Thus, the local accelerations of second device in the reference frame of the second device may be translated into local accelerations of the second device in the reference frame of the first device ($a_{xw}$, $a_{yw}$, $a_{zw}$), for example using equation 12 below.

$$\begin{pmatrix} a_{xw} \\ a_{yw} \\ a_{zw} \end{pmatrix} = C_b^{b2}\begin{pmatrix} a_{xb2} \\ a_{yb2} \\ a_{zb2} \end{pmatrix} \qquad (12)$$

It may be assumed that the displacement in the z axis of the reference frame of the first device (e.g., perpendicular to a face of the device) is not required to be considered when determining the distance and the direction of movement of the user's finger, as the determination of movement of the user in a plane parallel to the screen of the device (e.g., the x-y plane, where the z direction is perpendicular to the screen) will provide both the distance and direction moved relative to elements shown on a touch interface of the user device in ways which would affect which element is selected (e.g., motion perpendicular to the screen will not necessarily affect which element is selected). Therefore, the displacement of the user with respect to the first device in the x-y plane ($d_{xr}$, $d_{yr}$) may be determined by integrating twice the local accelerations of the first device in its reference frame ($a_{xb}$, $a_{yb}$), and the local accelerations of the user ($a_{xw}$, $a_{yw}$) in the reference frame of the first device.

As is described above, the local measurements of acceleration of the first device and the second device in the frame of reference of the first device can be integrated twice in order to determine position information (displacement) of the first device ($d_{xb}$, $d_{yb}$) and the second device ($d_{xw}$, $d_{yw}$) in a reference frame of the first device. A relative movement (e.g., shake) (e.g., a direction and distance moved) ($d_{xr}$, $d_{yr}$) between the first device and the second device may then be computed by subtracting the displacement of the second device from the displacement of the second device as illustrated by equation 13 below.

$$(d_{xr}, d_{yr}) = (d_{xb}, d_{yb}) - (d_{xw}, d_{yw}) \qquad (13)$$

The above method is an example of a method of determining the relative motion of the first device and a user based on first motion information relating to the first device and second motion information relating to the motion of the user. However, it will be appreciated that any appropriate method may be used in order to determine the relative motion. For example, the step of determining the global accelerations may be removed, where the measured accelerations of the second device in the reference frame of the second device may be translated into the reference frame of the first device, where the relative motion of the first device and the second device in the reference frame of the first device may then be calculated.

In the example above, it will be appreciated that the motion referred to in relation to the second device could equally be the motion of a user, e.g., the motion of a digit such as a finger of a user. For example, it will be appreciated that motion data of the secondary device may be processed in order to determine the likely motion of the tip of the digit used by the user to interact with the device, where the determined likely motion of the tip of the digit may then be used in the calculations outlined above to determine the relative motion between the digit of a user and the device. In particular, a trained model may be used to determine the likely motion of the tip of a finger based on motion information of a second device. For example, where the second device is a smart ring worn on the finger which is used for typing, it may be assumed that motion of the ring correlates with the motion of the tip of a finger, as generally the tip of the finger will not move substantially relative to the base of the finger. However, in some cases, the movement of the tip of the finger may be substantial. A trained model (in some cases, a personalized trained model which has been trained for a particular user) may be configured to predict the likely motion of the end of a user's digit while interacting with a touch user interface based on motion at the base of the finger. Similarly, in the case where the second device is a smart watch worn on the wrist, a trained model may be used to determine the likely motion of the end of a user's digit while interacting with a touch user interface based on motion at the wrist of the user. In any case, the model may be personalized, or trained, for a particular user.

In further examples, the motion of the user, or the user's digit may be determined using a sensor such as an imaging device. For example, an imaging device may produce image data including images of the user's digit over a time period, where tracking software may be used to detect the location of (the end of) a user's digit, and track the movement of the user's digit during a time period in which the user is interacting with the touch interface of the first device. For example, finger tracking processes may be used in order to track the motion of the user, in some examples, relative to a determined reference frame of the first device. The methods above may be used to determine the motion of the first device, and the motion of the user may be determined using the imaging device. The relative motion may then be determined.

The relative motion may then be used to determine the intended input based on the input information. For example, the relative motion of the user and the first device may indicate the motion of the end of a user's digit in a plane parallel to the first device, for example, in a plane parallel to a screen comprising a user interface with which the user is interacting. The motion of the user in this plane may be used to determine the input that the user intended to select. For example, the motion of the user may indicate the direction and distance from the intended input that the user has (unintentionally) moved. For example, by reversing the direction of the determined motion of the user from the initial input, the intended input may be determined. This relative movement may be determined in relation to a number of pixels, where the number of pixels moved may be determined based on the pixel density of the touch interface of the device and the calculated relative movement.

The relative movement may be determined during a user input time period. For example, the relative movement may be determined over a time period in which the digit of the user moves towards the user interface, up to the point at which the user makes the initial input, as this movement may indicate that the user is in the process of selecting an element of the user interface. The time period may be a time period over which a systematic movement is detected. For example, the digit of the user may repeatedly move side to side. This movement may be analyzed in order to detect a pattern of motion. Once a pattern has been detected, the intended input may be determined based on the pattern, and at which point in the pattern the initial input was selected. For example, where a finger of a user moves from side to side in a repetitive manner, it may be assumed that a central point of the side-to-side motion is the location that the user intended to select. Therefore, a determination of where in the cycle of the movement the user selects the initial input may be used to determine where the user was intending to perform an input. For example, where the motion is a repetitive motion, such as a "shake", signal processing methods may be used to determine the motion of the user relative to the first device, and predict the likely intended input based on a determination of at what point during the repeated motion the user performed the initial input, for example, the distance and direction from the center of the motion.

In one example, the location indicated by the distance and direction from the initial input may coincide with an element on the touch interface, where this element is then determined to be the intended input. In another example, the intended input may be based on a target region which is a distance and direction from the initial input as determined by the relative motion. For example, the target region may be a circular region with a center corresponding to the location indicated as being the determined distance and direction from the initial input. The target region may be of a size that correlates to the likelihood that the determined relative motion of the first device and the hand of the user from the input indicates the intended input. For example, where the determined relative motion indicates a target region which is a portion on an interface which does not comprise an element (e.g., is between two elements), the target region may be expanded, so that at least one element (e.g., both elements) is provided within the target region. A determination may then be made as to which of the elements the user intended to select, where one element may be more likely than another to be intended by the user. For example, where more than one element is provided within the target area, the element which the greater area within the target region may be determined to be the intended input. Alternatively, the determination may involve considering the other inputs of the user. For example, where a user is typing, the preceding keys that have been selected may indicate a likely word being typed by the user, where it may be determined that a key within the target area is the intended input based on the likelihood that the combination of the intended input and the preceding input form a word or part of a word. A key which is more likely to form a word (or form a word that is semantically consistent with prior words) may be selected as the intended input from a plurality of keys found within the target area.

At 310, control circuitry, e.g., control circuitry of the first device 103, implements a function corresponding to the intended input at the first device 103. For example, the intended input may be used in place of the initial input when implementing a function of a device. For example, where a user is typing, a key corresponding to the intended input may be used in place of the initial input, where the intended input may be displayed to the user as a selected key rather than the initial input. Alternatively, the intended input may be used to perform a function that is not visible to a user.

Figure 6:
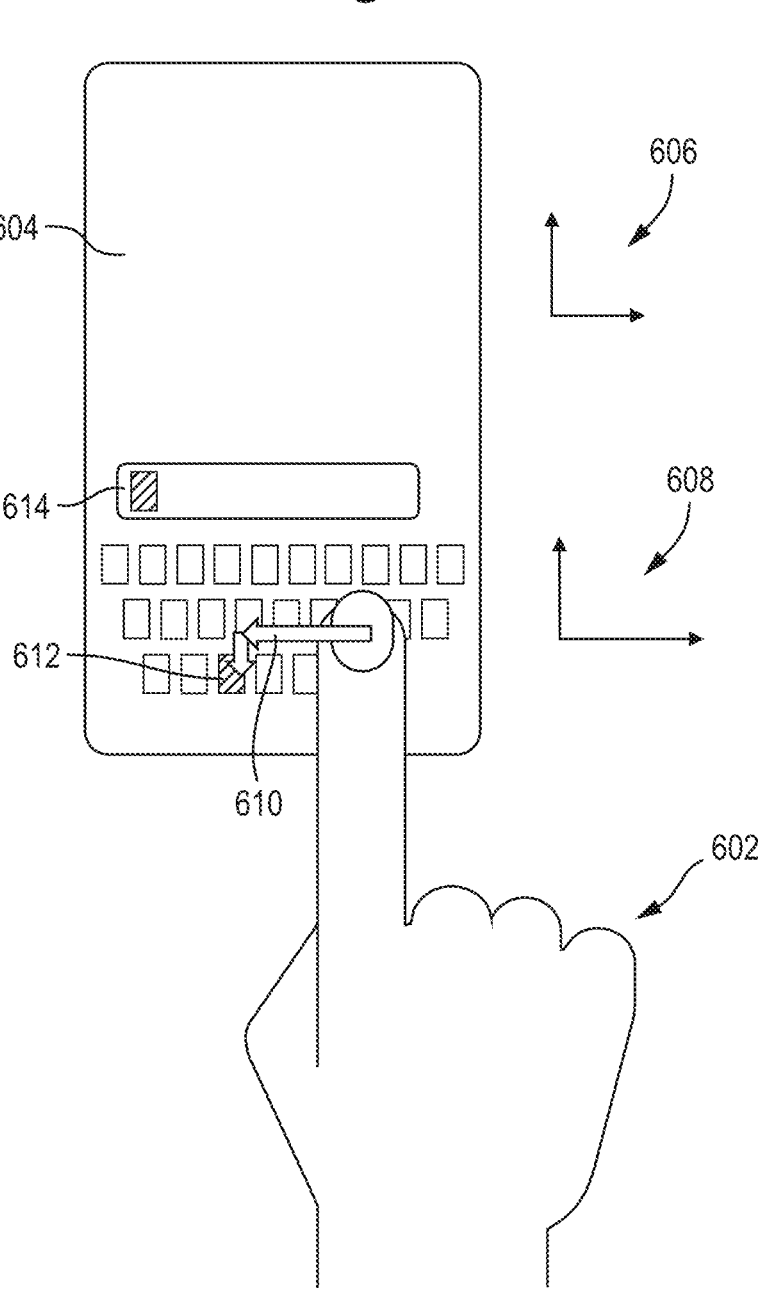
FIG. 6 illustrates an example of determining the intended input, in accordance with some examples of the disclosure.

FIG. 6 illustrates an example of determining the intended input based on the determined local relative movement between the first device and the user. In particular, FIG. 6 illustrates the motion of a hand of a user 602 and the motion of a user device 604 (e.g., the first device) while a user interacts with the device. For example, the user interacts with a touch interface of the first device 604 in order to select an element shown on the touch interface, which is taken to be the initial input (the initial input may be an element provided underneath the end of the finger of the user in this Figure). In this example, the motion of the user may be considered to be detected by a motion sensor worn by the user, and/or by an image sensor which observes the movement of the user, such as provided in an XR device or vehicle.

Using the methods above, the device motion 606 of the first device 604 in an x-y plane of the reference frame of the first device 604 is calculated, along with the user motion 608 of the user 602 in an x-y plane parallel to the x-y plane of the reference frame of the first device 604*a* (user motion 608 of this example is the motion of the end of a finger of the user). For example, the user motion 608 relative to the reference frame of the first device 604 may be determined using the methods described above. Similarly, the device motion 606 in the reference frame of the first device 604 may be determined using the methods described above. A calculation may be made as to the difference in motion of the first device 604 in the reference frame of the first device 604 and the motion of the user 602 in a plane parallel to the reference frame of the first device. By reversing the determined relative motion of the first device 604 and the user 602, a direction and distance in the x-y plane of the first device from the initial input 610 may be determined. In this example, an element is located the determined distance and direction from the initial input, where in this example, the element is taken to be the intended input 612 of the user. As is further shown in this Figure, the intended input is implemented at the first device, where the portion of the interface that displays letters 614 that have been selected by the user displays the intended input 612 rather than the initial input of the user 602.

In an example, the second sensor is provided in a wrist worn device. In an example, the wrist worn device may comprise a smart watch, a watch, a bracelet, a health tracker, or any combination thereof. Where the second sensor is provided in a wrist worn device, the second motion information may comprise information relating to the motion of the wrist of the user detected by the second sensor. For example, since a wrist worn device worn by a user has a relatively rigid connection between the wrist of the user and the smart watch, the motion of the wrist worn device will correspond to the movement of the wrist of the user, and therefore the hand of the user. The second motion information may be processed to predict the motion of an end of a digit of the user. For example, since the end of the digit which interacts with the interface may move relative to the wrist of the user on which the wrist worn device is provided, a trained model may be used in order to predict the movement of the end of the digit based on the detected movement of the smart watch. Thus, the above methods also apply to an example in which the second sensor is a wrist worn device, where the second motion information is processed to predict the motion of an end of a digit of the user based on the detected motion of the wrist of the user.

Figure 7:
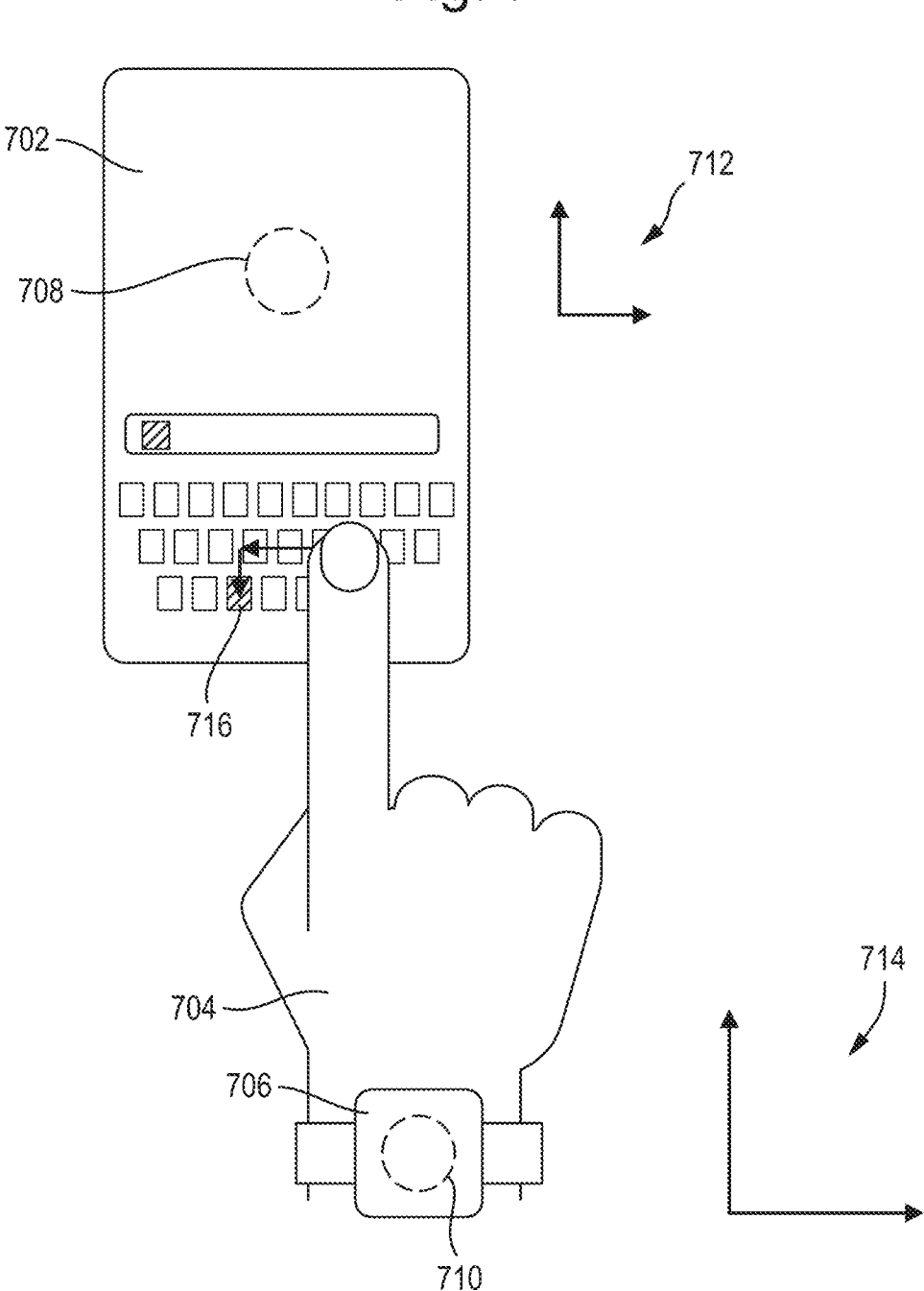
FIG. 7 illustrates a system for determining an intended input of a user, in accordance with some examples of the disclosure.

An example of a configuration in which the second sensor is provided in a wrist worn device is illustrated in FIG. 7. FIG. 7 illustrates a first device 702 with which a user 704 is interacting, where the user 704 is wearing a smart watch 706. In this example, the first sensor 708 is provided within the first device, and the second sensor 710 is provided within the smart watch 706 (second device). As is described in relation to the other examples above, first motion information 712 corresponding to the first device 702 is detected by the first sensor 708. Second motion information 714 corresponding to the movement of the user 704 is detected by the second sensor 710. In this example, the second motion corresponds to the movement of the wrist of the user 704. The second motion information is processed to determine the likely motion of the typing finger of the user 704. The likely motion of the typing finger is then used in the methods outlined above in combination with the first motion information and the initial input of the user 704 in order to determine the intended input 716 of the user 704.

In any of the examples herein, third motion information may be received. The third motion information may be sensed by a third sensor. In some examples, the third sensor is a motion sensor, for example, an accelerometer, a gyroscope, a gyrometer, a magnetic sensor, a proximity sensor, an inertial sensor, a GPS sensor, or an imaging device, or any combination or number thereof. (Equally, any of the sensors described above used to indicate the motion of the first device, user, and head of a user may be the same sensors or may be different sensors, in any combination.). The third sensor may be comprised in a head worn device, such as an extended reality device (e.g., augmented reality glasses or virtual reality head mounted device), or in the first device, second device, or a further device. For example, the third sensor may be provided in a vehicle. The third motion information may comprise information relating to the motion of the head of the user. For example, the third sensor may be configured to track the motion of a head of a user.

In any of the examples herein, fourth motion information may be received. The fourth motion information may be sensed by a fourth sensor. In some examples, the fourth sensor is a motion sensor, for example, an accelerometer, a gyroscope, a gyrometer, a magnetic sensor, a proximity sensor, an inertial sensor, a GPS sensor, or an imaging device, or any combination or number thereof. (Equally, any of the sensors described above used to indicate the motion of the first device, user, and head of a user may be the same sensors or may be different sensors, in any combination.). The fourth sensor may be comprised in a head worn device, such as an extended reality device (e.g., augmented reality glasses or virtual reality head mounted device), or in the first device, second device, or a further device. For example, the fourth sensor may be provided in a vehicle. The fourth motion information may comprise information relating to the motion of the eyes of a user.

The third motion information and/or the fourth motion information may be used to augment the determination as to the intended input of the user. For example, the motion of a user's head and the motion of a user's eye may indicate the location on the interface of the first device with which the user is intending to interact. For example, an element corresponds to a point at which the eyes of a user are looking on a user interface while the user provides user input is likely to be the element which the user intended to select. Therefore, once a target region has been determined as likely comprising the intended input, the motion of a user's eye may be used to determine which of the elements within the target region should be selected as the intended input. The user's head may move independently of the motion of the user's hand and the first device, for example, where a user is travelling in a vehicle. This motion may cause a lack of coordination between the hand of the user and the first device, as it may be difficult for the user to focus on their intended input. Alternatively, or additionally, the motion of the user's head or the motion of the user's eyes may be a motion that the user is unable to control (for example, due to a disease such as Parkinson's disease). A weighting factor may be applied to the determined direction and distance moved by the hand of the user relative to the first device based on the magnitude of the movement of the head or eyes of the user, for example, to increase the distance moved to the intended input. The weighting factor to be applied may be determined by a trained model which has been trained to determine the likely increase in error of user input caused by motion of the user's head or eyes.

In a further example, the interface (e.g., a graphical user interface, GUI) at the user device (first device) with which the user is interacting may be adapted based on the first motion information, the second motion information, and in some examples the intended input information. In particular, the interface may be translated or modified based on the relative movement of the user and the first device. For example, soft controls of the first device may be moved to a position which is likely to align more closely with subsequent actual user input. In a further example, the soft controls may be enlarged in order that they are easier for a user to select even when there is relative motion between the user and the first device, where the size of the controls may be proportional to the magnitude of movement between the user and the first device.

Figures 8A, 8B:
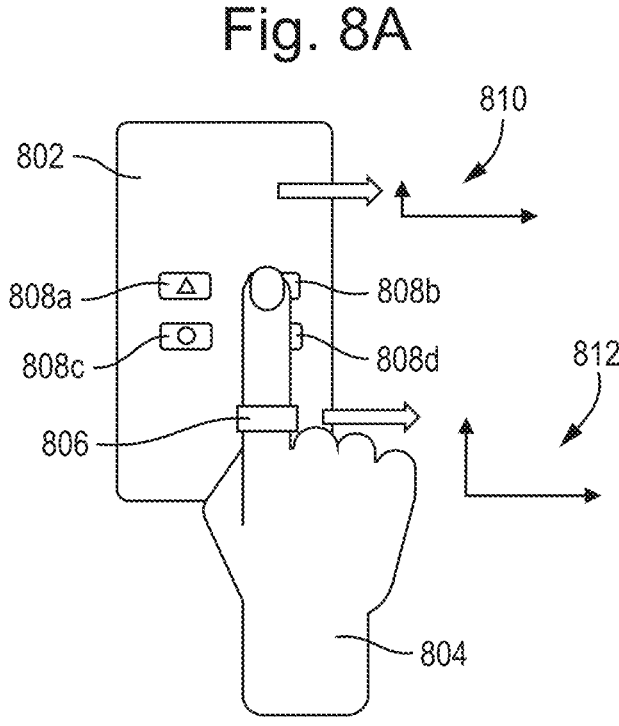
FIG. 8A and FIG. 8B illustrate a change of interface configuration, in accordance with some examples of the disclosure.

FIG. 8 illustrates a change of interface configuration according to an example. FIG. 8 illustrates a first device 802 with which a user 804 is interacting, and a second device 806 (a smart ring) which in this example the user is wearing on a digit. The user 804 in this example selects an element 808*a* from a plurality of elements 808*a*-808*d* displayed at the user interface of the first device 802.

As is illustrated in the upper portion of FIG. 8, labelled A, using methods outlined above, the relative motion of the first device 802 and the user 806 may be determined based on the movement of the first device 810 and the movement of the second device 812. In this example, the determined relative motion of the first device 802 and the user 806 is used in conjunction with the initial input (e.g., the element selected by the user) to determine an intended input of the user. It is determined that the intended input of the user is the triangle 808*a*, but it is the pentagon 808*b* that has been selected as the initial input. In this example, the relative movement of the user and the first device is greater in an X direction in a reference frame of the first device than in a Y direction in a reference frame of the first device, for example, the relative motion is mainly in a side-to-side direction. In this example, it is further determined that this motion is a repetitive motion, or shake, where the user's hand repeatedly moves side to side relative to the first device. As is show here, the user interface is reconfigured to account for this repetitive relative motion. In particular, as is illustrated in FIG. 8, in the lower portion labeled B, each of the elements 808*a*-808*d* are translated into a list configuration rather than a square configuration, and each of the elements is expanded in the X-Y direction. In this way, the effect of the side-to-side motion of the user relative to the device while the user selects an element during an interaction with the interface of the first device may be reduced, e.g., the accuracy of the user's input may be improved.

In an example, the methods are performed while the user wears an extended reality head worn device. In one example, the extended reality head worn device is a pair of augmented reality glasses. Equally, the extended reality head worn device may be any augmented reality device, such as augmented reality contact lenses. The second sensor may be comprised in the extended reality head worn device or in a further device (e.g., a second device such as a smart ring as described above, or may be an imaging device provided in the head worn device). The second sensor of the augmented reality glasses may be a camera. For example, the images produced by the second sensor may be used to track the motion of a user's hand using any appropriate tracking processes, where the motion of a user's hand may be tracked in 3D space. In this example, the second sensor will be assumed to be provided in a second device such as a smart ring, however, it will be appreciated that the second device may be the extended reality head worn device, and the second sensor may be provided within the extended reality head worn device.

Where the user interacts with the first device while wearing an extended reality device, such as a pair of augmented reality glasses, the interface corresponding to the first device with which the user interacts may be an augmented interface (e.g., the interface may comprise the interface of the first device and additional controls effectively projected onto or adjacent to the interface of the first device). For example, soft controls may be displayed to the side of the device in addition to or instead of the controls of the first device shown in an interface of the first device. In this example, the augmented interface is effectively fixed to the first device, where motion of the first device will correspond to motion of the augmented interface. The user may interact with the augmented interface in the same manner as described above in relation to the user interacting with the touch interface of the first device. As is described in the methods above, first motion information corresponding to the first device (and therefore corresponding to the motion of the augmented interface) may be used in conjunction with second motion information corresponding to the motion of the user (e.g., detected using the extended reality device or the second device (e.g., smart ring)), along with initial input information. The initial input may be an input of the augmented interface. For example, the initial input may be an element of the interface of the device which is displayed by the first device, or may be an element provided by the extended reality device in the augmented interface. Where the user interacts with an element provided by the extended reality device, the input information corresponding to the element may be sent to the first device. The methods above may then be used to determine the intended input.

The augmented interface may be adapted based on the determined relative motion and in some cases the intended input in the same way as is described above in relation to the adaptation of the interface of the first device. Where the interface is an augmented interface, the augmented interface may comprise augmented controls comprising duplicate controls of the controls shown in the interface of the first device or additional controls. The augmented controls may be configured based on the relative motion of the first device and the user. For example, the duplicate controls may be larger or positioned further apart than the controls of the first device, e.g., where large relative motion is detected, so that it is easier for the user to accurately select an element. In an example, where the elements are keys of a keyboard, an augmented keyboard may be displayed, e.g., above or below the device, where the augmented keyboard is larger, and/or with keys spread out further, than the keyboard of the first device. The correction of input described above may be applied in subsequent interactions of the user with the augmented interface.

Figure 9A:
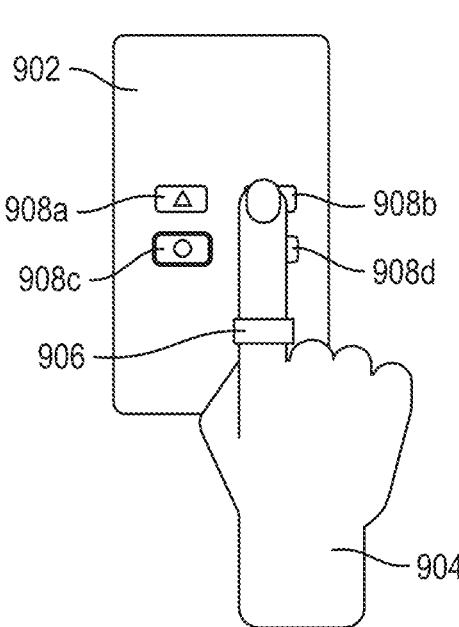
FIG. 9A and FIG. 9B illustrate a change of interface configuration, in accordance with some examples of the disclosure.
Figure 9B:
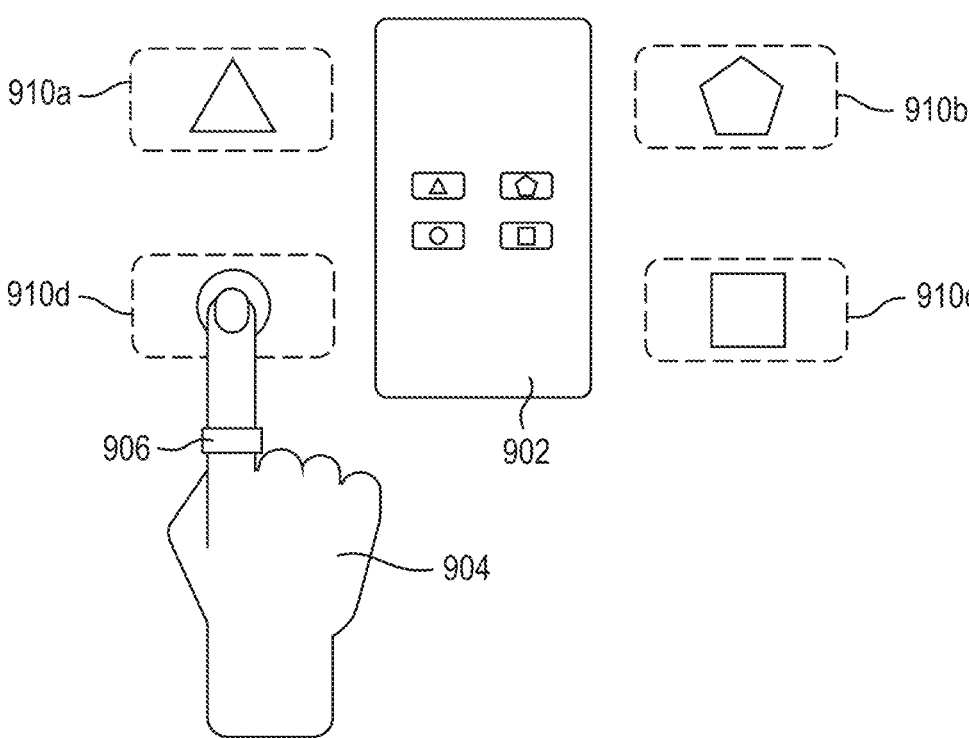

An example of such an augmented interface is illustrated in FIG. 9. FIG. 9 illustrates a first device 902 with which a user 904 is interacting, where the user 904 is wearing a smart ring 906 along with an XR device (not shown). In this example, the first sensor is provided in the first device 902, and the second sensor is provided within the smart ring 906 (second device). Equally, the second sensor may be provided in the XR device rather than a smart ring. As is illustrated in the upper portion of FIG. 9, labelled A, the user 904 in this example selects an element 908*a* from a plurality of elements 908*a*-908*d* displayed at the user interface of the first device 902.

Using methods outlined above, the relative motion of the first device 902 and the user 906 may be determined based on the movement of the first device 910 and the movement of the second device 912. In this example, the determined relative motion of the first device 902 and the user 906 is used in conjunction with the initial input (e.g., the element selected by the user) to determine an intended input of the user. In this example, the element selected by the user is the pentagon 980*b*. It is determined that the intended input of the user is the circle 908*c*. In this instance, the input of the user is corrected so that a function performed by the first device uses as the input the circle rather than the pentagon.

Based on a determination that there is a relative motion between the first device and the user, or based on the relative motion, it is further determined that it would be beneficial to augment the user interface by providing the elements of the interface of the first device in a manner that would enable a user to more accurately interact with the elements. As is shown in the lower portion of FIG. 9, labelled B, the XR device provides an augmented interface, which comprises a second plurality of elements 910*a*-910*d* corresponding to the plurality of elements 908*a*-908*d* shown within the augmented user interface adjacent to the user interface of the first device, where the second plurality of elements 910*a*-910*d* are provided in a configuration whereby the elements are spaced out and are larger. This may enable the user to select a subsequent element more accurately. The spacing and size may be based on the relative motion between the user and the first device. For example, where the relative motion is large, the sizing and/or spacing may be greater than where the relative motion is small. Where the motion is a repetitive motion, for example, a side to side motion, the size of each element shown in the augmented interface may be the width of the side to side motion, so that even with the relative motion, the correct element may be selected, as movement from an intended position at a center of the element does not move outside the boundary of the element. Equally, the augmented interface may be projected over the interface of the first device.

In a further example, the augmented interface may move relative to a reference frame of the first device based on the relative motion of the user and the first device, e.g., independently of the first device. For example, the movement of the augmented interface may correspond to the movement of the user, so that the augmented interface does not move relative to a reference frame of the user (e.g., the hand or finger of the user). The augmented interface may move based on the motion of the head of the user. For example, the motion of the head of the user may be used to adapt the augmented interface to compensate for the motion of the head of the user.

In a further example, the methods are performed while the user wears an extended reality head worn device. The XR device may be a virtual reality head mounted device. The first device in this example may be a virtual device with which the user interacts in a virtual space. The intended input of an interaction of a user with the virtual device may be determined in the same manner as described above in relation to the interaction of the user with the first device.

For example, the virtual device may be fixed relative to a real world object, or an anchor point in 3D virtual space, where a sensor, such as a camera, determines the motion of the real world object, and thus determines the motion of the virtual device which is fixed in relation to the real world object. The motion of the hand of the user while it interacts with the virtual device may also be detected by a sensor, such as a camera (for example, the same sensor or a different sensor that detects the motion of the user) provided in the XR device, or a motion sensor, for example, provided in extended reality gloves working in combination with the XR device (or equally, detected by a wrist worn or finger worn device). The relative motion of the hand of the user and the virtual device may be determined using the methods described above. An intended input of the user may then be corrected using the determined relative motion between the user and the virtual device, and an initial input of the user.

In a further example, the elements displayed on the virtual interface of the virtual device may be translated or transformed within the bounds of the virtual device as is described above in relation to FIG. 8 (the virtual interface may be a part of a virtual input system provided by the XR device). Additionally, or alternatively, the elements displayed on the virtual device may be translated or transformed to be presented outside the bounds of the virtual device, for example, in a similar manner to that described in relation to the augmented display of FIG. 9. Alternatively, or additionally, the virtual device itself may be translated or transformed based on the relative motion of the user and the first device. For example, where the virtual device is an interactable object, an interaction envelope may be expanded based on the relative motion of the user with the first device. For example, the size of the virtual device and the elements for interaction displayed thereon may be increased. Thus, the likelihood that a user will accurately select an element will be increased in subsequent interactions of the user with the virtual device. In some examples, the interaction envelope may be expanded based on third motion information relating to the motion of the head of the user, as is described in relation to examples above. The virtual interface may move based on the motion of the head of the user. For example, the motion of the head of the user may be used to adapt the virtual interface to compensate for the motion of the head of the user. The virtual device may equally display elements as described above in relation to the augmented interface, where the virtual device may retain its shape and size, but additional elements may be displayed around the device with which the user is able to interact, where the additional elements are configured based on the relative motion of the user and the virtual device.

FIG. 10 shows a flowchart representing an illustrative process 1000 for correcting the input of a user according to an example. While the example shown in FIG. 10 refers to the use of system 100, as shown in FIG. 1A or FIG. 1B, it will be appreciated that the illustrative process shown in FIG. 10, may be implemented, in whole or in part, on system 100 and system 200, either alone or in combination with each other, and/or any other appropriately configured system architecture. The process 1000 starts at A.

At 1002, first motion indicating the motion of a first device during a user input time period is received.

Then, at 1004, second motion information indicating the motion of a user during the user input time period is received.

Then, at 1006 the second motion information is processed to predict the motion of an end of the digit. For example, the second motion information is processed to predict the motion of an end of the digit in relation to a reference frame of the first device.

Then, at 1008 the relative motion of the end of the digit of the user with respect to the first device is determined. For example, the first motion information and the processed second motion information are used to determine the relative motion of the user and the first device.

Then, at 1010, input information relating to an interaction of the user with the first device is received. For example, the input information relates to an initial input of the user corresponding to the actual input of the user.

At 1022, third motion information indicating the motion of a user during a user input time is received. For example, the third motion information may indicate the motion of a head or an eye of the user.

Following the receiving of the input information at 1010, and the receiving of the third motion information at 1022, at 1012 a distance and a direction moved by the end of a digit of the user from the initial input during the user input time period is determined. For example, the distance and direction moved is determined based on the relative motion of the first device and the end of the digit of the user, where this distance and direction from the initial input indicates a region in which the intended input may be found.

Then, at 1014, an input in the region located the determined distance and direction from the initial input may be selected as the intended input. For example, the most likely input in the indicated region may be selected as the intended input.

Then, at 1016, a function corresponding to the intended input is implemented, for example, at the first device. For example, the intended input may be used in place of the initial input.

Then, at 1018, it is determined whether the first device is an interactable object, for example, a virtual device.

Where the first device is an interactable object (YES at 1018), at 1020, an interaction envelope of the interactable object is expanded based on the second motion information. In some examples, the interaction envelope of the interactable object is expanded based on the first motion information, the second motion information and/or the intended input. The process then proceeds back to the start of the process A.

Where the first device is not an interactable object (NO at 1018), the process proceeds back to the start of the process A.

After receiving input information at 1010, at 1024, it is determined whether the input information is received through a virtual input system. For example, it is determined whether the interaction of the user is with a virtual device or using an extended reality system comprising an extended reality device, where the virtual input system is superimposed e.g., on the first device.

Where the input information is received via a virtual input system (YES at 1024), at 1026, a superimposed virtual input system (e.g., a virtual device) is moved based on the first motion information, the second motion information, and the input information.

Where the input information is not received via a virtual input system (NO at 1024), the process proceeds back to the start of the process A.

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features and limitations described in any one example may be applied to any other example herein, and flowcharts or examples relating to one example may be combined with any other example in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:

receiving, using control circuitry, first motion information detected by a first sensor indicating a motion of a first physical device, the first physical device comprising a processor and a graphical user interface (GUI) on which a plurality of soft control elements are displayed;

receiving, using control circuitry, second motion information detected by a second sensor integrated into a physical extended reality (XR) device indicating a motion of a user, the first physical device connected to the physical XR device via a network;

receiving, using control circuitry, input information relating to a first interaction of the user with the first physical device, wherein the first interaction occurs at a first time;

determining, using control circuitry, an intended input based on the first motion information, the second motion information, and the input information, wherein the intended input comprises a location of an input region and corresponds to an input region that relates to the interaction of the user with the first physical device and wherein the intended input is related to a soft control element of the plurality of soft control elements;

translating, using control circuitry, the location of the input region to compensate for the motion of the first physical device and the motion of the user based on the first motion information and the second motion information;

superimposing, using the physical XR device, a virtual input system onto the first physical device for receiving the input information;

moving, using the physical XR device, the superimposed virtual input system based on the first motion information, the second motion information, and the input information;

implementing, at the first physical device and using control circuitry, a function corresponding to the intended input;

based on a location of the soft control element relative to the GUI, the first motion information, and the second motion information, performing a first adjustment of the soft control element;

at second time subsequent to the first time, receiving a second interaction of the user with the first physical device;

determining a second intended input based on the second interaction of the user with the first physical device;

determining that the second intended input is related to the soft control element; and

based on the location of the soft control element relative to the GUI and the first adjustment of the soft control element, performing a second adjustment of the soft control element;

wherein the first adjustment and the second adjustment is at least one of translating the location of the soft control element, modifying a shape of the soft control element, or enlarging the soft control element.

2. The method of claim 1, wherein the determining of the intended input comprises determining a relative motion of an end of a digit of the user with respect to the first physical device based on the first motion information and the second motion information.

3. The method of claim 1, wherein the determining the intended input comprises determining a distance and a direction moved by an end of a digit of the user from an initial input during a user input time period, and selecting as the intended input an input in a region located the determined direction and distance from the initial input.

4. The method of claim 1, wherein the second motion information comprises information relating to a motion of a digit of the user, the method further comprising:

receiving, from a third sensor incorporated into a smart ring, third motion information; and processing the second motion information and the third motion information to predict a motion of an end of the digit.

5. The method of claim 1, wherein the second motion information comprises information relating to a motion of a wrist of the user, the method further comprising:

receiving, from a third sensor incorporated into a wrist worn device, third motion information; and processing the second motion information and the third motion information to predict a motion of an end of a digit of the user.

6. The method of claim 1, wherein the second sensor is an imaging device, wherein the second motion information comprises information relating to image data of a motion of a digit of the user obtained by the imaging device, and wherein the method further comprises processing the second motion information to determine a motion of an end of the digit.

7. The method of claim 1, wherein the first sensor is comprised in the physical XR device, the physical XR device displays a virtual device;

optionally, wherein the virtual device is an interactable object, and wherein an interaction envelope of the interactable object is expanded based on the second motion information and optionally third motion information comprising detected head movement of the user.

8. The method of claim 1, wherein the determining is performed using additional information from a fourth sensor, the fourth sensor configured to perform eye tracking to determine the intended input of the user or configured to detect head movement of the user.

9. The method of claim 1, wherein at least one of:

the first physical device is one of: a smartphone, a tablet, a touch interface, an augmented device, or a smartwatch;

the first sensor is a motion sensor or is an imaging device useable to capture image data of the motion of the first physical device;

the first sensor is comprised in at least one of: a smartphone, a smart watch, or a vehicle; and

the second sensor is a motion sensor or is an imaging device useable to capture image data of the motion of the user.

10. The method of claim 1, wherein an interaction envelope of the intended input is expanded based on the first motion information and the second motion information in conjunction with the translating.

11. A system comprising control circuitry configured to:

receive first motion information detected by a first sensor indicating a motion of a first physical device, the first physical device comprising a processor and a graphical user interface (GUI) on which a plurality of soft control elements are displayed;

receive second motion information detected by a second sensor integrated into a physical extended reality (XR) device indicating a motion of a user, the first physical device connected to the physical XR device via a network;

receive input information relating to a first interaction of the user with the first physical device, wherein the first interaction occurs at a first time;

determine an intended input based on the first motion information, the second motion information, and the input information, wherein the intended input comprises a location of an input region and corresponds to an input region that relates to the interaction of the user with the first physical device and wherein the intended input is related to a soft control element of the plurality of soft control elements;

translate the location of the input region to compensate for the motion of the first physical device and the motion of the user based on the first motion information and the second motion information;

superimpose a virtual input system onto the first physical device for receiving the input information;

move the superimposed virtual input system based on the first motion information, the second motion information, and the input information;

implement, at the first physical device, a function corresponding to the intended input;

based on a location of the soft control element relative to the GUI, the first motion information, and the second motion information, perform a first adjustment of the soft control element;

at second time subsequent to the first time, receive a second interaction of the user with the first physical device;

determine a second intended input based on the second interaction of the user with the first physical device;

determine that the second intended input is related to the soft control element; and based on the location of the soft control element relative to the GUI and the first adjustment of the soft control element, perform a second adjustment of the soft control element;

wherein the first adjustment and the second adjustment is at least one of translating the location of the soft control element, modifying a shape of the soft control element, or enlarging the soft control element.

12. The system of claim 11, wherein the determining of the intended input comprises determining a relative motion of an end of a digit of the user with respect to the first physical device based on the first motion information and the second motion information.

13. The system of claim 11, wherein the determining the intended input comprises determining a distance and a direction moved by an end of a digit of the user from an initial input during a user input time period, and selecting as the intended input an input in a region located the determined direction and distance from the initial input.

14. The system of claim 11, wherein the second motion information comprises information relating to a motion of a wrist of the user, and wherein the control circuitry is further configured to:

receive, from a third sensor incorporated into a wrist worn device, third motion information; and process the second motion information and the third motion information to predict a motion of an end of a digit of the user.

15. The system of claim 11, wherein the second sensor is an imaging device, wherein the second motion information comprises information relating to image data of a motion of a digit of the user obtained by the imaging device, and wherein the system comprises control circuitry further configured to process the second motion information to determine a motion of an end of the digit.

16. The system of claim 11, wherein the first sensor is comprised in the physical XR device, the physical XR device displays a virtual device;

optionally, wherein the virtual device is an interactable object, and wherein an interaction envelope of the interactable object is expanded based on the second motion information and optionally third motion information comprising detected head movement of the user.

17. The system of claim 11, wherein at least one of:

the first physical device is one of: a smartphone, a tablet, a touch interface, an augmented device, or a smartwatch;

the first sensor is a motion sensor or is an imaging device useable to capture image data of the motion of the first physical device;

the first sensor is comprised in at least one of: a smartphone, a smart watch, or a vehicle; and the second sensor is a motion sensor or is an imaging device useable to capture image data of the motion of the user.

18. A system comprising:

means for receiving first motion information detected by a first sensor indicating a motion of a first physical device, the first physical device comprising a processor and a graphical user interface (GUI) on which a plurality of soft control elements are displayed;

means for receiving second motion information detected by a second sensor integrated into an extended reality (XR) device indicating a motion of a user, the first physical device connected to the physical XR device via a network;

means for receiving input information relating to a first interaction of the user with the first physical device, wherein the first interaction occurs at a first time;

means for determining an intended input based on the first motion information, the second motion information, and the input information, wherein the intended input comprises a location of an input region and corresponds to an input region that relates to the interaction of the user with the first physical device and wherein the intended input is related to a soft control element of the plurality of soft control elements;

means for translating the location of the input region to compensate for the motion of the first physical device and the motion of the user based on the first motion information and the second motion information;

means for superimposing a virtual input system onto the first physical device for receiving the input information;

means for moving the superimposed virtual input system based on the first motion information, the second motion information, and the input information;

means for implementing, at the first physical device, a function corresponding to the intended input;

means for performing, based on a location of the soft control element relative to the GUI, the first motion information, and the second motion information, a first adjustment of the soft control element;

means for receiving, at second time subsequent to the first time, a second interaction of the user with the first physical device;

means for determining a second intended input based on the second interaction of the user with the first physical device;

means for determining that the second intended input is related to the soft control element; and means for performing, based on the location of the soft control element relative to the GUI and the first adjustment of the soft control element, a second adjustment of the soft control element;

wherein the first adjustment and the second adjustment is at least one of translating the location of the soft control element, modifying a shape of the soft control element, or enlarging the soft control element.

\* \* \* \* \*